(12) United States Patent
Li et al.

(10) Patent No.: US 8,311,159 B2
(45) Date of Patent: Nov. 13, 2012

(54) METHODS AND SYSTEMS FOR TIME TRACKING IN OFDM SYSTEMS

(75) Inventors: Junqiang Li, Sunnyvale, CA (US); Matthias Brehler, Boulder, CO (US); Je Woo Kim, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 980 days.

(21) Appl. No.: 12/351,797

(22) Filed: Jan. 9, 2009

(65) Prior Publication Data

US 2010/0177852 A1 Jul. 15, 2010

(51) Int. Cl.
*H04L 27/06* (2006.01)
(52) U.S. Cl. ....................................................... 375/340
(58) Field of Classification Search ............. 375/240.18, 375/340; 370/210; 379/406.13; 708/404, 708/405; 342/196
See application file for complete search history.

(56) References Cited

U.S. PATENT DOCUMENTS

| | | | |
|---|---|---|---|
| 5,539,412 A * | 7/1996 | Mendelson | 342/192 |
| 7,609,773 B2 | 10/2009 | Bhushan et al. | |
| 7,693,227 B2 * | 4/2010 | Varadarajan et al. | 375/260 |
| 2009/0097577 A1 * | 4/2009 | Adachi et al. | 375/260 |

FOREIGN PATENT DOCUMENTS

JP 2000269930 A * 9/2000

OTHER PUBLICATIONS

International Search Report & Written Opinion—US2010/020494—International Search Authority—European Patent Office—Jun. 10, 2010.

* cited by examiner

*Primary Examiner* — Khanh C Tran
(74) *Attorney, Agent, or Firm* — Tyler J. Overall

(57) ABSTRACT

Techniques proposed in the present disclosure may used to update an FFT window position and perform linear phase compensation for OFDM wireless systems with up to two antennas at the receiver. Techniques presented herein may help resolve a problem of determining an optimum FFT window position under the condition that the length of channel impulse response is larger than the length of cyclic prefix.

48 Claims, 19 Drawing Sheets

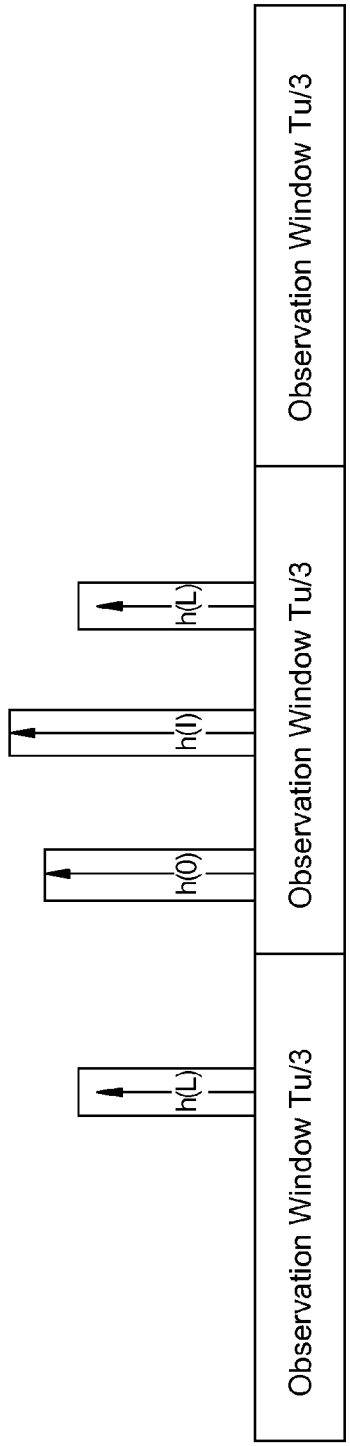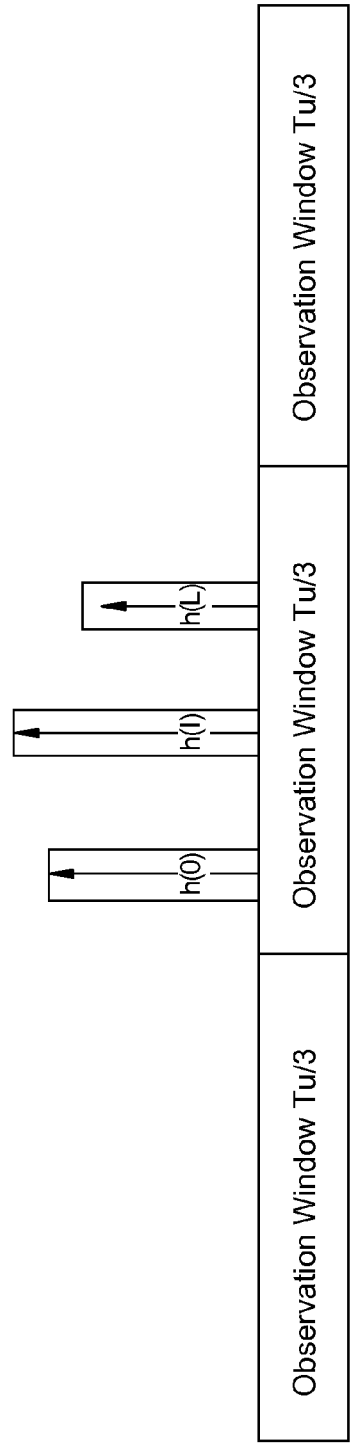

METHODS AND SYSTEMS FOR TIME TRACKING IN OFDM SYSTEMS

TECHNICAL FIELD

The present disclosure generally relates to communication and more specifically to a method for tracking a position of Fast Fourier Transform (FFT) window applied at a receiver of an Orthogonal Frequency Division Multiplexing (OFDM) wireless system.

SUMMARY

Certain embodiments provide a method for updating a position of the Fast Fourier Transform (FFT) window at a receiver. The method generally includes performing an initial multipath cluster classification within an original observation window, wherein pairs of detected channel paths are assigned to a same multipath cluster if a position gap between corresponding channel paths is smaller than a defined observation silence period, and detecting channel paths by comparing energy of samples with a noise variance multiplied by a predefined threshold parameter.

Certain embodiments provide an apparatus for updating a position of the Fast Fourier Transform (FFT) window at a receiver. The apparatus generally includes logic for performing an initial multipath cluster classification within an original observation window, wherein pairs of detected channel paths are assigned to a same multipath cluster if a position gap between corresponding channel paths is smaller than a defined observation silence period, and logic for detecting channel paths by comparing energy of samples with a noise variance multiplied by a predefined threshold parameter.

Certain embodiments provide an apparatus for updating a position of the Fast Fourier Transform (FFT) window at a receiver. The apparatus generally includes means for performing an initial multipath cluster classification within an original observation window, wherein pairs of detected channel paths are assigned to a same multipath cluster if a position gap between corresponding channel paths is smaller than a defined observation silence period, and means for detecting channel paths by comparing energy of samples with a noise variance multiplied by a predefined threshold parameter.

Certain embodiments provide a computer-program product for updating a position of the Fast Fourier Transform (FFT) window at a receiver, comprising a computer readable medium having instructions stored thereon, the instructions being executable by one or more processors. The instructions generally include instructions for performing an initial multipath cluster classification within an original observation window, wherein pairs of detected channel paths are assigned to a same multipath cluster if a position gap between corresponding channel paths is smaller than a defined observation silence period, and instructions for detecting channel paths by comparing energy of samples with a noise variance multiplied by a predefined threshold parameter.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIGS. 7A-7D illustrate a pilot verification method for estimation of the multipath channel profile based on cluster excluding law in accordance with certain embodiments of the present disclosure.

DETAILED DESCRIPTION

Figure 1:
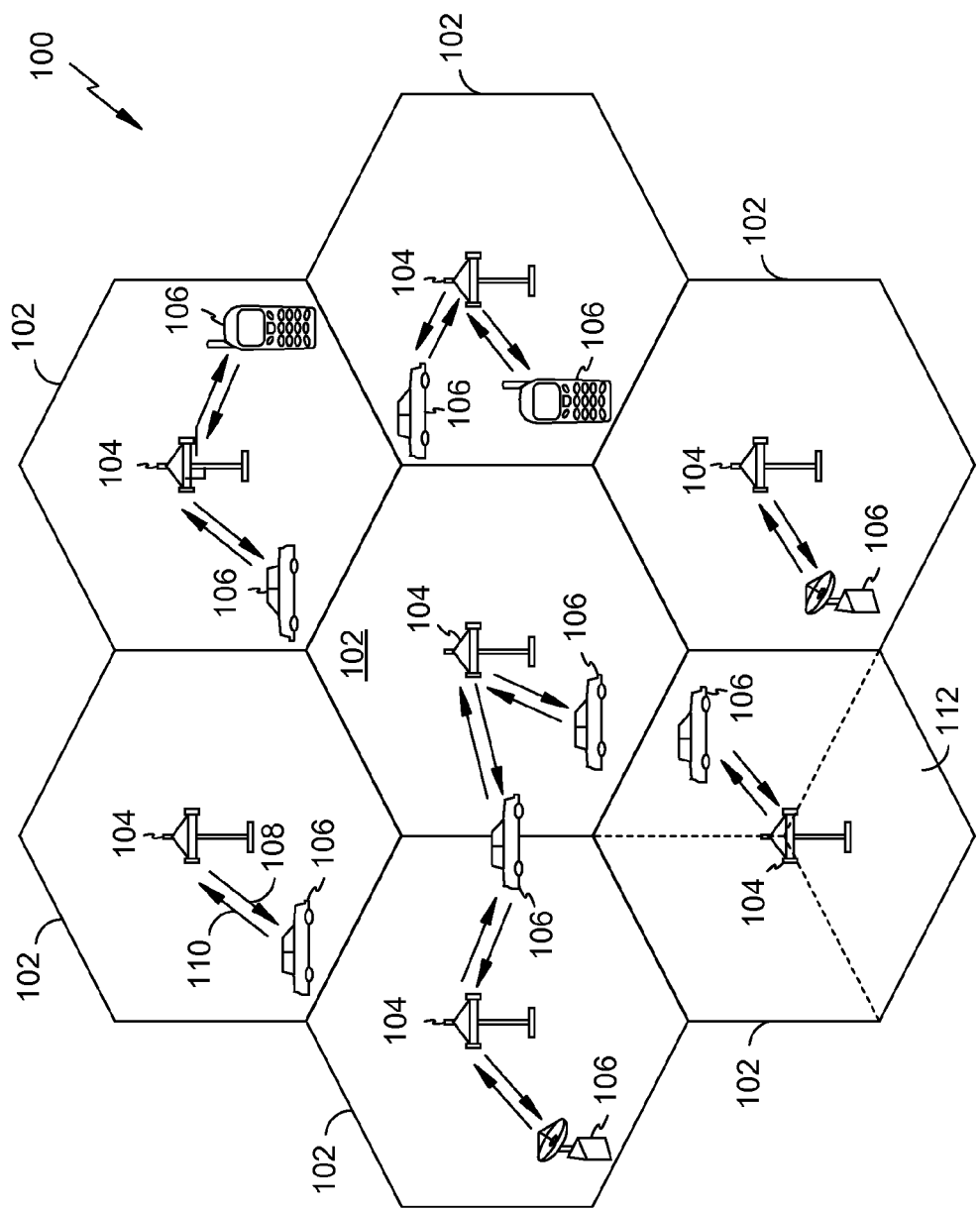
FIG. 1 illustrates an example wireless communication system, in accordance with certain embodiments of the present disclosure.

The word "exemplary" is used herein to mean "serving as an example, instance, or illustration." Any embodiment described herein as "exemplary" is not necessarily to be construed as preferred, advantageous, combinatory or mutually exclusive over other embodiments.

Communication systems are widely deployed to provide various communication services such as voice, packet data, etc. These systems may be time, frequency, and/or code division multiple-access based systems capable of supporting a simultaneous communication with multiple users by sharing available system resources. Examples of such multiple-access systems include Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

Orthogonal Frequency Division Multiplexing (OFDM) and Orthogonal Frequency Division Multiple Access (OFDMA) are exemplary techniques that are widely utilized in wireless environments to transmit and receive data. OFDM scheme modulates digital information onto an analog carrier electromagnetic signal, and is utilized in the IEEE 802.11a/g WLAN standard, 802.16, and 802.20. An OFDM baseband signal is a sum of a number of orthogonal subcarriers, where each subcarrier is independently modulated by its own data. Benefits of OFDM over other conventional wireless communication protocols include ease of filtering noise, ability to vary upstream and downstream data rates (which can be accomplished by way of allocating more or fewer subcarriers for each purpose), ability to mitigate effects of frequency-selective fading, etc.

A Fast Fourier Transform (FFT) of time domain received samples may be employed as an integral part of processing at the receiver of OFDM wireless system. The FFT operation may need to be applied within an appropriate time window in order to preserve orthogonality of subcarriers. A position of the time window for FFT operation may directly correspond to a boundary between adjacent OFDM symbols in time. Therefore, in order to effectively employ OFDM as a communications protocol, position of the FFT window may need to be accurately determined at the receiver.

A cyclic prefix (CP) can be located at a portion of an OFDM symbol that may be located first in time, and can include samples that exist within the OFDM symbol that may be located last in time. Therefore, a boundary between adjacent OFDM symbols that include cyclic prefixes (CPs) may be determined by locating CPs within OFDM symbols. A correlating unit (e.g., a cross-correlator, an autocorrelator, a delay correlator, etc) may correlate the CP with samples within the OFDM symbol and evaluate a correlation energy. The peak energy level may be indicative of the boundary between OFDM symbols, and thereafter an FFT operation may be applied to samples within the OFDM symbol delivered at the receiver next in time. If a multi-path effect is not an issue for a particular wireless environment and no noise exists upon such wireless channel, the peak energy determined by the correlating component could be utilized to precisely locate the boundary between OFDM symbols (position of the FFT window).

Channels, however, are frequently associated with various types of noise thus rendering it more difficult to determine location of the peak energy level output by the correlating unit. Furthermore, wireless channels are often subject to the multi-path effect, wherein disparate portions of a symbol are delivered over different physical paths (or substantially similar portions of a signal are delivered over disparate physical paths), which can cause delay with respect to a receiver observing a plurality of samples. Thus, output of a correlating unit can produce a heightened flat energy level that does not include a peak energy level corresponding to the boundary between OFDM symbols. Moreover, when noise is accumulated on a wireless channel, it can be difficult to accurately determine the boundary between OFDM symbols. In particular, if there is a substantial disparity with respect to location in time of an energy peak determined by the correlating unit and location of the boundary between adjacent OFDM symbols in time, errors can occur, thereby compromising accuracy of the receiver.

In order to mitigate inter-symbol interference (ISI) between adjacent OFDM symbols in time, the length of CP may be typically chosen to be larger than the length of channel impulse response (CIR). However, a portion of the OFDM symbol dedicated for the CP may also be chosen to be smaller than the CIR length in order to increase the spectral efficiency and information throughput. In the case when the length of CIR is larger than the length of CP, determination of the precise location of the beginning of the FFT window (boundary between adjacent OFDM symbols) may become even more difficult due to a high level of inter-symbol interference (ISI) that originates from adjacent OFDM symbols in time.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
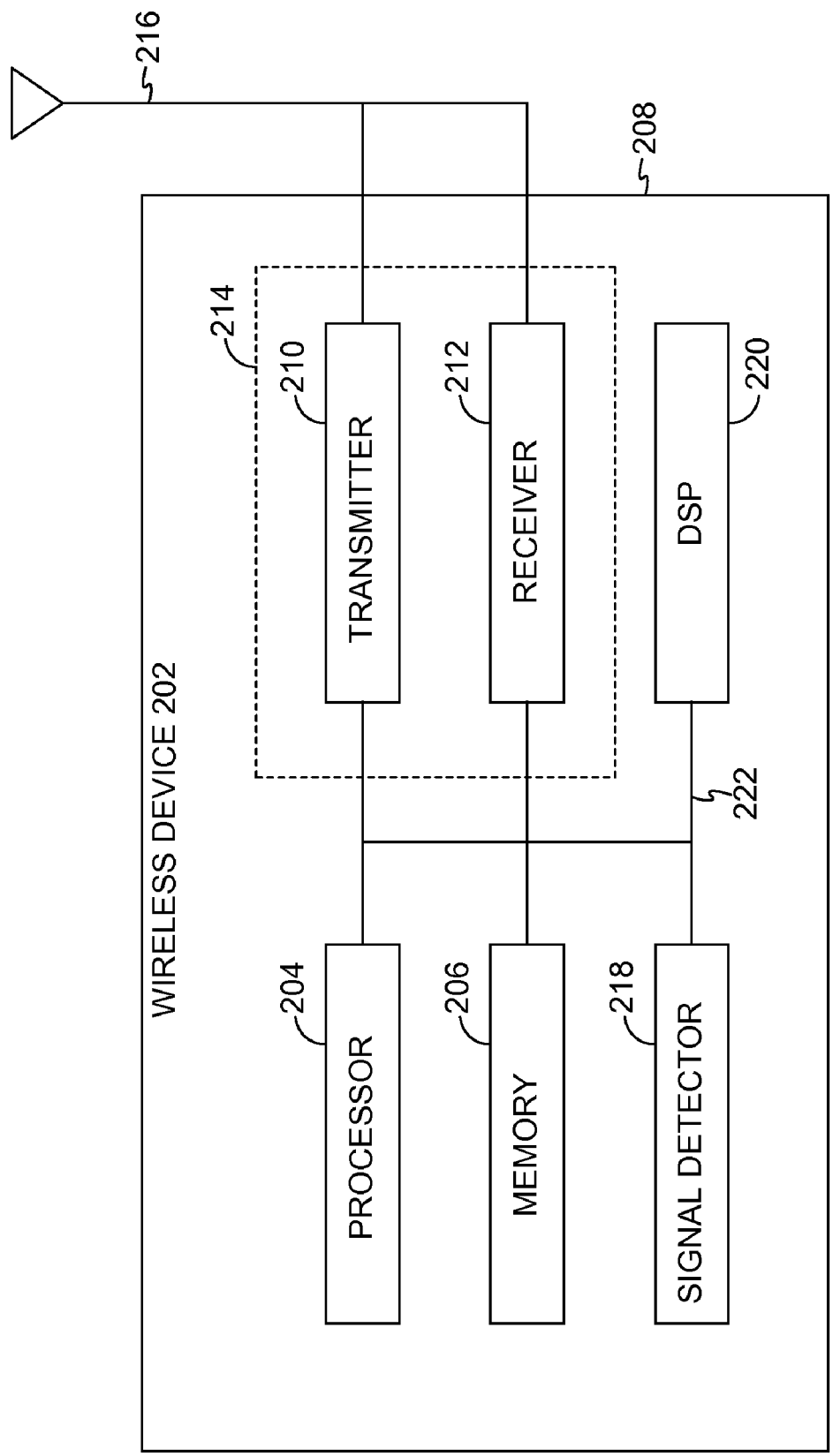
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
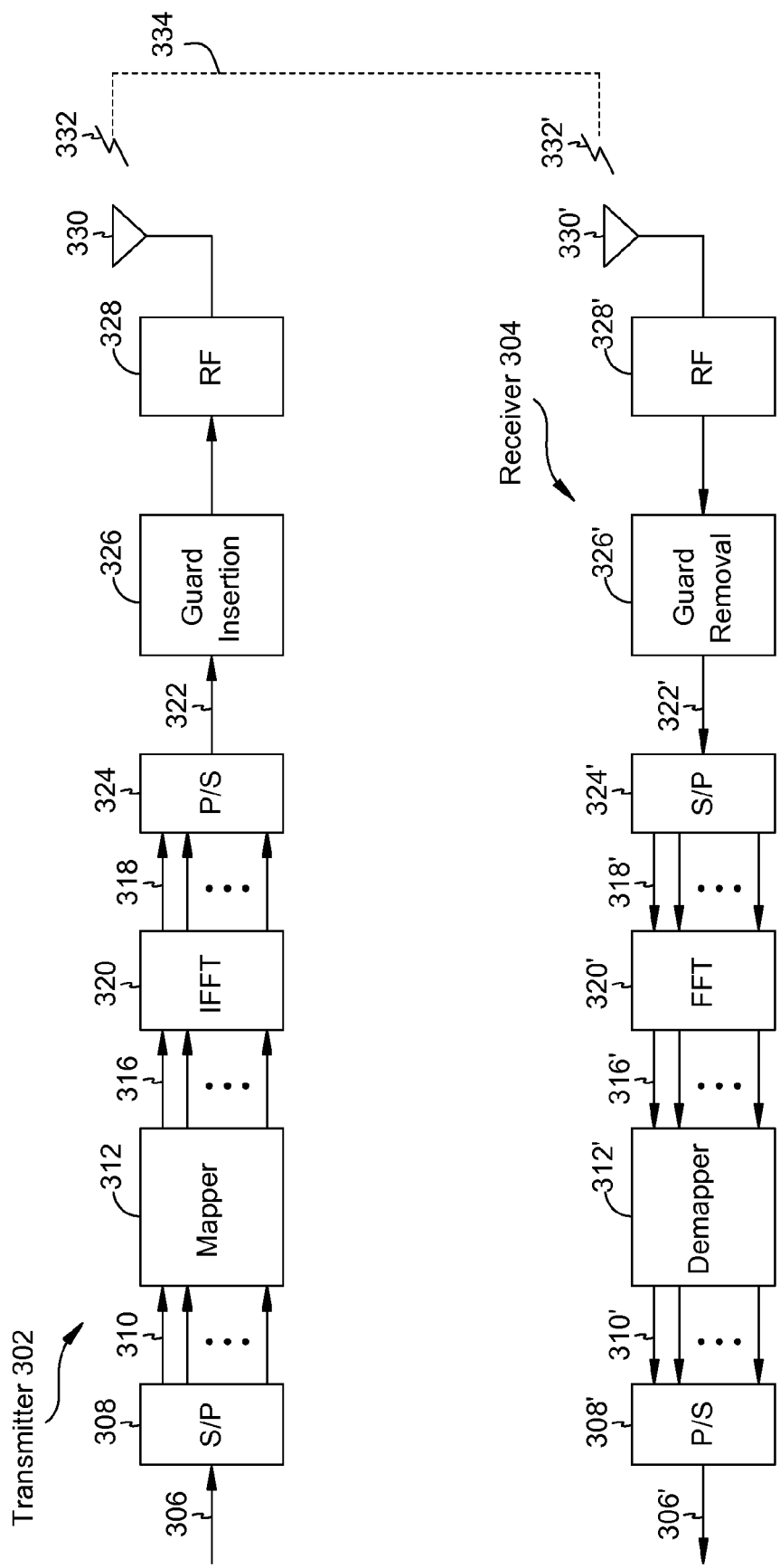
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, Ns, is equal to Ncp (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Exemplary Time Tracking Algorithm

A time tracking method proposed in the present disclosure may provide an FFT window position and linear phase compensation for OFDM wireless system with multiple antennas at the receiver. The FFT window offset for a currently processed OFDM symbol may be determined based on the initial FFT window offset established during the acquisition of previous OFDM symbols due to channel environments with deep fading such as, for example, a birth-death channel. Moreover, according to certain embodiments, a time tracking algorithm may resolve a problem of determining an optimum FFT window position when the length of channel impulse response (CIR) is larger than the length of cyclic prefix (CP).

For certain embodiments of the present disclosure, CIR length may be smaller than $1/3 \cdot T_U$ (i.e., one third of duration of useful OFDM symbol), and the initial FFT window offset may be within the CP length. Moreover, for certain embodiments of the present disclosure, it may be assumed that a CIR length of 1/8 of the time duration of useful OFDM symbol. If the wireless system under the WiMAX standard is considered, the frame duration is 5 msec, and it can be assumed that the carrier frequency offset and the preamble sequence of the strongest sector may be acquired during some previously performed procedures.

For an exemplary WiMAX system with the frequency domain pilot pattern that occupies every third frequency subcarrier, a length of observation window in the time domain may be equal to $1/3 \cdot T_U$. If the maximum CIR length is smaller than the guard interval (e.g., $1/8 \cdot T_U$), it may be possible to accurately determine locations of the first arrival path (FAP) and the last arrival path (LAP) within the time duration of the observation window. One position from a plurality of uncorrupted positions within the CP may be assumed to be a possible FFT window position.

However, if the CIR length is larger than $1/8 \cdot T_U$, the time tracking loop (TTL) algorithm based on maximizing the carrier-to-noise (C/N) ratio value at the receiver may provide an optimal FFT window position. Furthermore, if the channel delay spread is larger than $1/6 \cdot T_U$ (i.e., half of the time duration of the observation window), the true FAP and LAP positions may be identified within the observation window. The tracking algorithm for the position of FFT window may be performed based on the verified channel profile.

Exemplary Time Domain Profile

Based on the frequency domain pilot symbols that are equally spaced by several subcarriers, the channel impulse response represented in the frequency domain may be obtained as:

$$H_{Pi} = Y_{pl}/S_{Pl}, \qquad (1)$$

where $p_l$ is the subcarrier index for the lth pilot symbol, $Y_{pl}$ is the FFT output of the received sample and $S_{pl}$ is the known transmitted pilot symbol.

Figure 4:
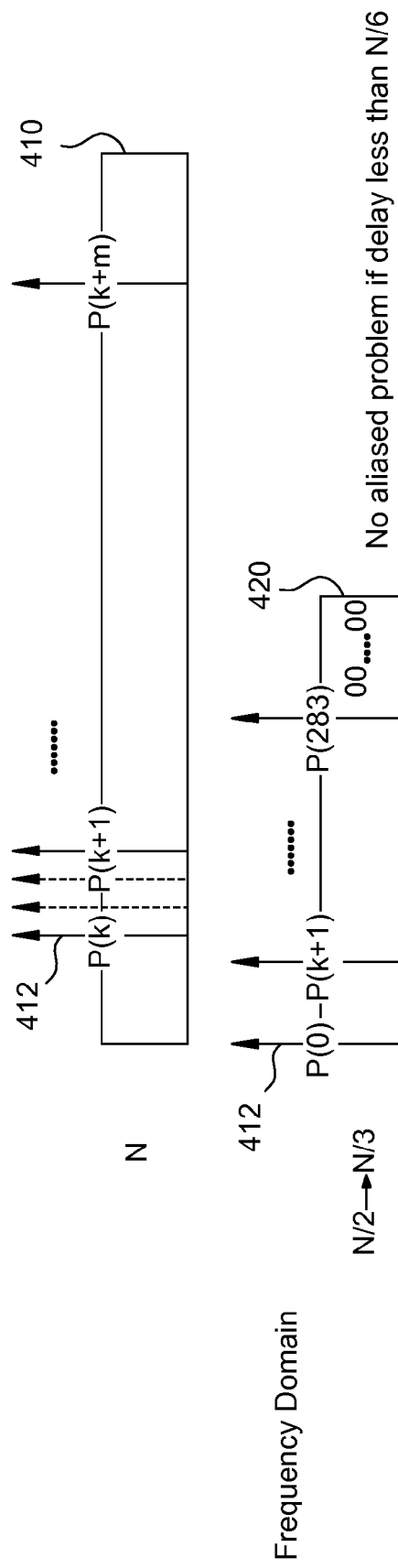
FIG. 4 illustrates a processing in time domain for estimation of a channel profile in accordance with certain embodiments of the present disclosure.

FIG. 4 illustrates the downlink preamble 410 of size N samples. The illustrated example may assume an exemplary case with 284 pilot symbols 412 with a frequency gap of three subcarriers between each pilot symbol. In order to reduce the computational complexity, an Inverse Fast Fourier Transform (IFFT) of size 512 (or 256) samples may be utilized rather than the IFFT operation of size 1024 to generate the estimated channel profile in time domain. The kth channel path may be represented in time domain as:

$$h_k = \frac{1}{\sqrt{N}} \sum_{l=0}^{N-1} w_l \times H_{p_l} \exp\left(j\frac{2\pi kl}{N}\right), \qquad (2)$$

$$N = 512 \text{ or } 256$$

where $H_{pl}=0$ with $l \geq 284$, and $w_l$ is the Hamming window function.

In order to smooth the noise floor within the observation window of time duration $1/3 \cdot T_U$, the Hamming window $w_l$ with length of 284 samples may be applied to the frequency domain channel response $H_{pl}$. In an exemplary case when the IFFT size of N=256 samples is utilized, the frequency domain channel response $H_{pl}$ at the middle 256 subcarriers out of 284 subcarriers may be applied in equation (2).

It may be noted that the estimated channel response $h_k$ in equation (2) is not the real channel response in time domain, but may further need to be scaled by the oversampling rate of 3/2 (or 3/4). Also, the phase of each channel path may need to be rotated because an input signal 420 of the IFFT operation may be shifted in the frequency domain, as shown in FIG. 4. Moreover, channel paths may be circularly shifted due to the FFT observation window offset.

Since only the time domain channel profile may be of importance, only the oversampling rate of 3/2 (or 3/4) may need to be considered for further processing, and the phase rotation of the channel path may be ignored. However, an aliasing problem of the FAP and the LAP that may occur due to the FFT observation window offset and due to a large channel delay spread may need to be identified before determining the position of FFT window applied at the receiver.

Exemplary Extended Observation Window

After obtaining the scaled time domain channel profile, channel paths may be detected by setting a particular threshold factor value y for a level of path energy. In order to reduce the number of candidates for a possible location of the first arriving path, 512 (or 256) samples within the observation window may be divided into several multipath clusters with a various number of samples in each cluster. By setting $\delta_n^2$ as the noise floor, samples with energy larger than $\gamma \cdot \delta_n^2$ may be considered as valid channel paths within a multipath cluster.

In order to remove an effect of multipath energy on the noise floor, two calculations may be performed. First, the noise power may be calculated such that it includes all samples within the observation window. After setting the threshold parameter to a first level (e.g., $\gamma=10$), initial multipath detection results may be obtained. Secondly, the noise power may be calculated by excluding samples from detected multipath positions within the observation window. By setting the threshold parameter to a second level (e.g., $\gamma=4$), weak channel paths may be detected.

With an assumption that the channel adjustment range may be $1/3 \cdot T_U$, which may be limited to the width of channel observation window (i.e., $1/3 \cdot T_U$), and the CIR length is assumed to be smaller than $1/3 \cdot T_U$, then the observation silence period may be defined as the time period equal to the width of observation window minus the maximum length of CIR (channel delay spread). As an example, if the observation silence period is $1/48 \cdot T_U$, the maximum channel delay spread that may be supported may be $15/48 \cdot T_U$. Samples in the observation window that satisfy the threshold requirements may belong to the same multipath cluster if their mutual position gaps are smaller than the observation silence period. Otherwise, samples with the mutual position gap larger than the observation silence period may belong to different multipath clusters.

Assuming M clusters that may include channel paths satisfying threshold requirements, positions of the first channel path and the last channel path in each multipath cluster may be stored as a possible position of true FAP and true LAP. For the mth multipath cluster, there may be three possible time offsets: $t_m$ and $t_m \pm 1/3 T_U$. Therefore, there may be up to 2M+1 different (FAP, LAP) combination pairs.

Figure 5:
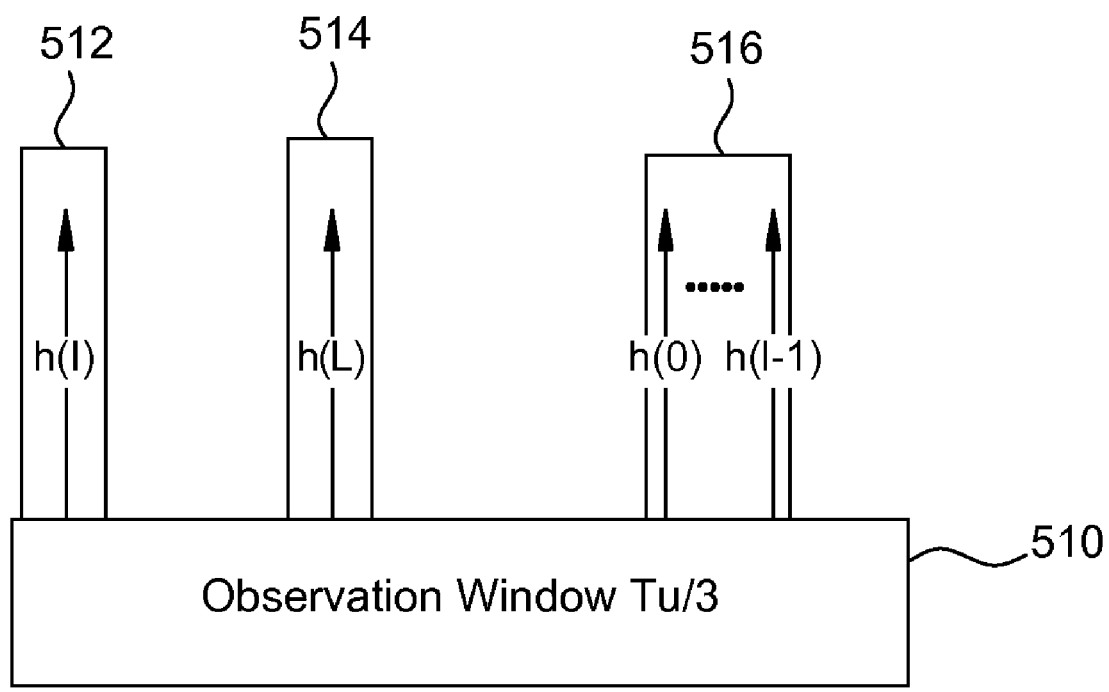
FIG. 5 illustrates a channel profile within an observation window with offset in accordance with certain embodiments of the present disclosure.

As an example, it can be assumed that the FFT window position may be offset at the right direction compared to the position of the true FAP. The channel profile within the observation window 510 is illustrated in FIG. 5, where a total of L+1 channel paths may satisfy previously defined threshold requirements and all channel paths may be classified to three multipath clusters 512, 514, and 516. In this particular case, positions of the FAP and the LAP may be ambiguous since the first path h(0) may be circularly shifted to the end of the observation window, which causes an aliasing.

Figure 6:
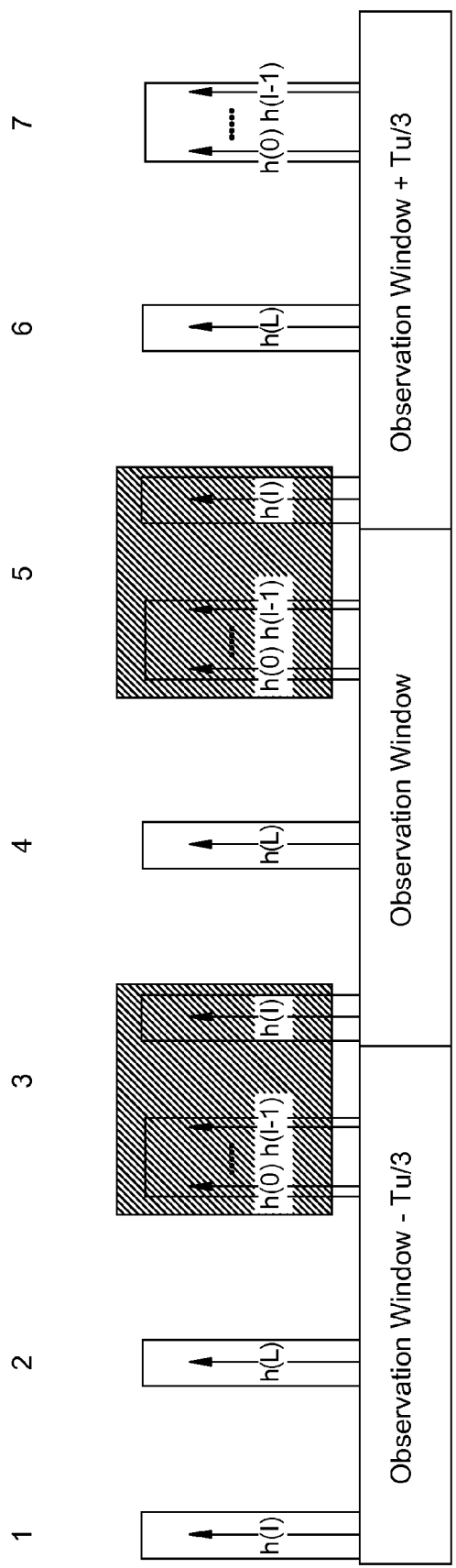
FIG. 6 illustrates an extended observation window with cluster reassignment in accordance with certain embodiments of the present disclosure.

In order to resolve the aliasing problem, an extended observation window method may be proposed as illustrated in FIG. 6, where multipath clusters are reassigned according to the mutual relation of position gaps. After the reassignment of multipath clusters, for one embodiment of the present disclosure there may be a total of seven multipath clusters within the extended observation window, as illustrated in FIG. 6. According to the criterion that samples with mutual position gaps smaller than the observation silence period may belong to the same multipath cluster, and may also belong within the time duration of all possible (FAP, LAP) combination pairs, the entire channel profile may need to be included in the original observation window of size $1/3 \cdot T_U$, as illustrated in FIG. 5. For one embodiment of the present disclosure, there may be a total of four possible (FAP, LAP) combination pairs to be verified within the extended observation window: (cluster2_FAP, cluster3_LAP), (cluster3_FAP, cluster4_LAP), (cluster4_FAP, cluster5_LAP), and (cluster5_FAP, cluster6_LAP). By utilizing either a CP-based correlation or a pilot-based correlation method for path-verification, the maximum correlation value may be determined among all considered (FAP, LAP) combination pairs.

In the case of CP-based verification, one combination pair with the largest CP correlation value among all possible (FAP, LAP) combination pairs may be selected as the true (FAP, LAP) combination pair. The scaling factor of 3/2 or 3/4 may also need to be applied on the previously estimated channel impulse response. In order to collect the entire energy of all channel paths, the left replica of the CP correlation may stretch from the beginning of the guard of possible FAP position to the end of the guard of the corresponding LAP position. The right replica of the CP correlation may be N=1024 samples later (i.e., the correlation length could be larger than the CP length).

The pilot-based verification may be more reliable than the CP-based verification due to a pseudo-random nose (PN) sequence gain, especially for small values of carrier-to-noise ratio, and for an exemplary case with high inter-symbol interference (ISI) when the length of CIR is significantly larger than the length of CP. However, according to the auto-correlation characteristics of the reference signal, an exact position of channel paths may need to be known in order to utilize the pilot-based correlation in contrast to the CP-based correlation algorithm. The reason for this is a small offset (i.e., usually of one or two samples) that may be introduced during the path detection algorithm and due to a transformation of sampling rate. In order to resolve a problem of the small offset, a small range peak search may be applied before the pilot-based correlation. On the other hand, in order to collect the most power from all channel paths, a small-range-peak search procedure may be performed around a position of the channel path with the largest energy in each multipath cluster.

Figure 7A:
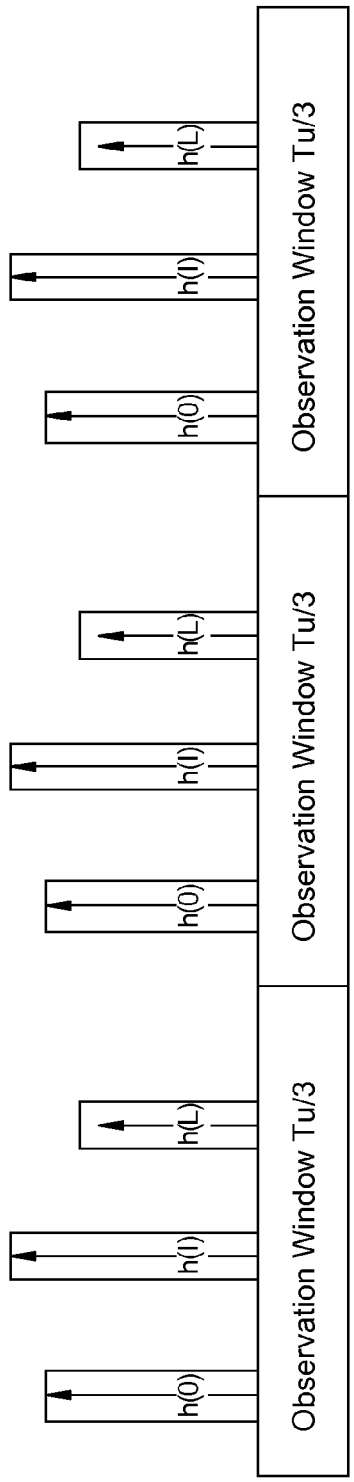
Figure 7B:
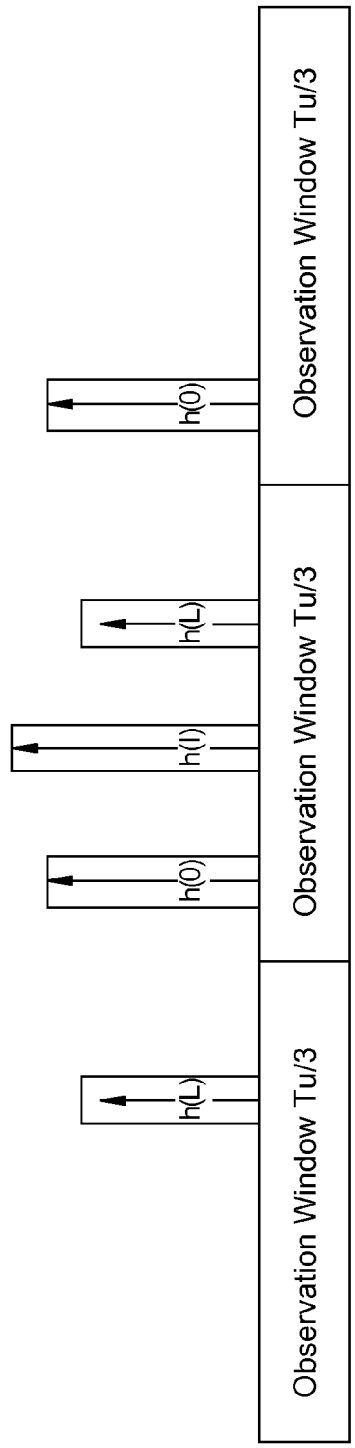

In order to reduce a total number of pilot correlations, a "cluster excluding" method may be applied. An example of this approach is illustrated in FIGS. 7A-7D. The number of multipath clusters M equal to three may be assumed for one embodiment of the present disclosure. Therefore, the number of clusters that are utilized for the verification of positions of channel paths may be then equal to 3M=9. Instead of verifying all 3M possible multipath clusters, it may be first required to verify only the channel path with the largest energy as illustrated in FIG. 7A. After that, the search range of residual multipath clusters may be narrowed as illustrated in FIG. 7B. In order to further reduce the search range of possible residual clusters, the second and the third largest energy path in possible multipath cluster may be verified as shown in FIG. 7B and FIG. 7C, respectively. This operation may be performed until the most likely channel profile is obtained as illustrated in FIG. 7D. It can be observed that in the worst case the maximum number of multipath clusters utilized during the verification may be reduced from 3M to:

$$\#\text{cluster\_verify} = 3 + 2 + (M-2) \times 2 = 2M+1 \qquad (3)$$

Exemplary Simplified Estimation of the Channel Profile

Figure 8:
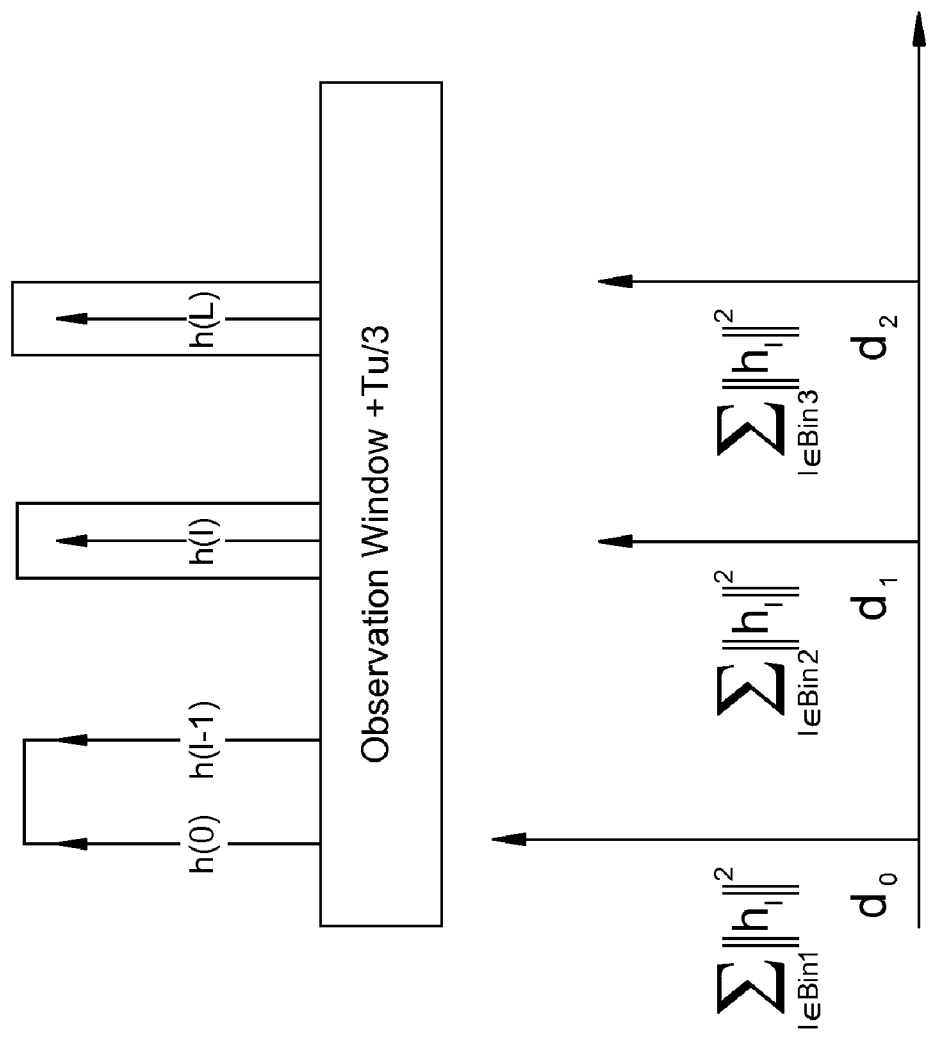
FIG. 8 illustrates a simplified estimation of the multipath channel profile in a wireless system with one receive antenna in accordance with certain embodiments of the present disclosure.

A simplified estimation of channel profile that is illustrated in FIG. 8 may be performed to reduce the computational complexity. Every channel multipath from the multipath cluster may be mapped to a single path with a power equal to a total power of all channel paths within the multipath cluster, while a path delay may be equal to a time delay of the sample position with the largest power level (i.e., starting point of pilot correlation within each multipath cluster). Furthermore, an equivalent time delay of the first channel path may be modified to correspond to the time delay of the FAP location and an equivalent time delay of the last channel path may be modified to correspond to the time delay of the LAP location, as it is also illustrated in FIG. 8.

Figure 9:
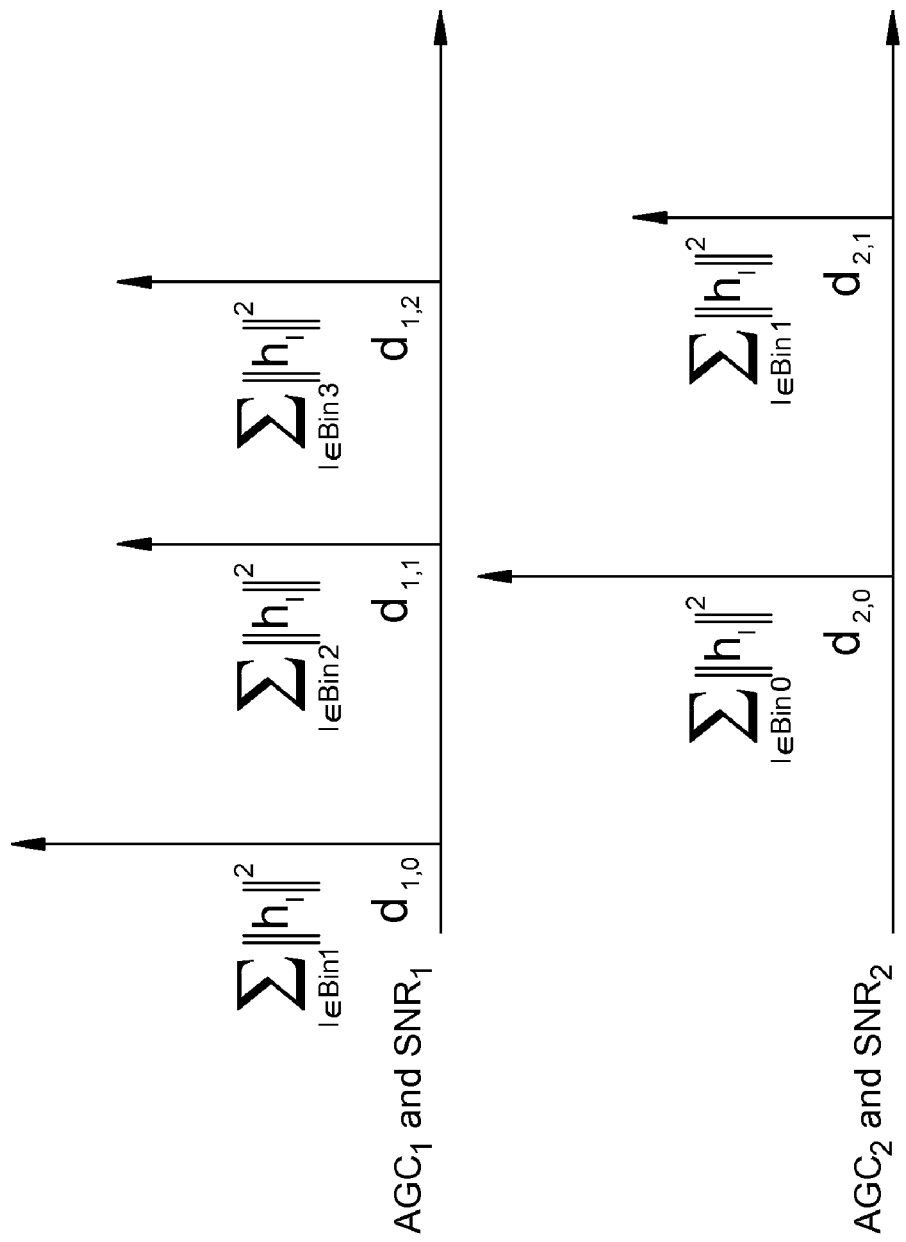
FIG. 9 illustrates a simplified estimation of the multipath channel profile in a wireless system with two receive antennas in accordance with certain embodiments of the present disclosure.

In an example case of a receiver with two antennas, the channel profile for one antenna may be substantially different from the channel profile for the other antenna due to two completely independent fading profiles. Therefore, estimation of the CIR length and the linear phase compensation may have different values for each antenna at the receiver. Different channel delays and power profiles for two independent channels corresponding to two receive antennas are illustrated in FIG. 9.

Exemplary Adjustment of the FFT Window Position

The time tracking loop (TTL) algorithm proposed in this disclosure may force the FFT window to an optimum position for achieving the best possible error rate performance. Furthermore, the estimated length of CIR and the linear phase compensation corresponding to the FTT window position can be further utilized to improve the channel estimation in frequency domain.

For certain embodiments of the present disclosure, when the measured CIR length is smaller than the CP length, there may be a plurality of possible candidates for the FFT window position. However, the inter-carrier interference (ICI) may be present within the OFDM symbol due to a high Doppler frequency, and some samples may be corrupted. Therefore, uncorrupted samples within the time duration equal to the CP length decreased by the length of CIR may be utilized to improve an error rate performance in high Doppler channel environments. The FFT window position p may be determined in this exemplary case as:

$$p = FAP + CIR\_length + (CP - CIR\_length)/2, \quad (4)$$

where the CIR length may be equal to:

$$CIR\_length = LAP - FAP. \quad (5)$$

For certain embodiments of the present disclosure when the CIR length is larger than the CP length, significant level of inter-symbol interference (ISI) and inter-carrier interference (ICI) may be observed due to the offset from the correct FFT window position. An optimum position of FFT window may be determined such that the carrier-to-noise (C/N) ratio within the range between the FAP (i.e., the first arrival path) and the LAP (i.e., the last arrival path) may be maximized. The relation between C/N ratio and the FFT window position p may be expressed as the ratio between a desired signal energy captured within the FFT window of size N samples, and a noise energy that corresponds to ISI and ICI components captured inside the same FFT window:

$$\frac{C}{N}(p) = \frac{\sum_{l:l=p}^{d_l<p+G} |h_l|^2 + \sum_{l:l=0}^{d_l<p} \left(\frac{N-p+d_l}{N}\right)^2 |h_l|^2 + \sum_{l:d_l>p+G}^{d_{L-1}} \left(\frac{N-(d_l-G-p)}{N}\right)^2 |h_l|^2}{\sum_{l:l=0}^{d_l<p} \left(\frac{2(p-d_l)}{N} - \left(\frac{p-d_l}{N}\right)^2\right)|h_l|^2 + \sum_{l:d_l>p+G}^{d_{L-1}} \left(\frac{2(d_l-G-p)}{N} - \left(\frac{d_l-G-p}{N}\right)^2\right)|h_l|^2 + \delta_\eta^2} \quad (6)$$

It can be assumed that there are L channel paths with the channel time delay $d_l$ for the arbitrary lth channel path (l=0,1,...,L−1), and $h_l$ is the time domain channel impulse response for the lth channel path. For the sake of simplicity, equation (6) may be rewritten as:

$$\frac{C}{N}(p) = \frac{\sum_{l:l=p}^{d_l<p+G} |h_l|^2 + \sum_{l:l=0}^{d_l<p} a_l \times |h_l|^2 + \sum_{l:d_l>p+G}^{d_{L-1}} b_l \times |h_l|^2}{\sum_{l:l=0}^{d_l<p} (1-a_l) \times |h_l|^2 + \sum_{l:d_l>p+G}^{d_{L-1}} (1-b_l) \times |h_l|^2 + \delta_\eta^2} = \frac{\sum_{l:all} |h_l|^2 - Pow_{ICI,ISI}(p)}{Pow_{ICI,ISI}(p) + \delta_\eta^2}, \quad (7)$$

where:

$$Pow_{ICI,ISI}(p) = \sum_{l:l=0}^{d_l<p} (1-a_l) \times |h_l|^2 + \sum_{l:d_l>p+G}^{d_{L-1}} (1-b_l) \times |h_l|^2, \quad (8)$$

$$a_l = \left(\frac{N-p+d_l}{N}\right)^2, \quad d_l < p, \quad (9)$$

and $$b_l = \left(\frac{N-(d_l-G-p)}{N}\right)^2, \quad d_l > G+p \quad (10)$$

In the case of a single antenna receiver, the optimum FFT window position may be determined by maximizing the C/N ratio given by equation (7):

$$p_{opt} = \underset{p}{\operatorname{argmax}}\left(\frac{C}{N}(p)\right) \quad (11)$$

For an exemplary case of two antennas at the receiver, independent fading for channel impulse responses that correspond to two receive antennas may be considered, and an individual independent detection of the FAP and the LAP for each receive antenna may be employed. Based on the channel profiles at both receive antennas, a common FFT window position may be obtained by utilizing the maximum ratio combining (MRC) on C/N ratio values at each receive antenna.

A total channel delay for a receiver with two antennas (i.e., a total CIR length) may be determined as the maximum channel delay for both antennas decreased by the minimum channel delay for both antennas. A possible position of FFT window may be within the time span from the minimum time delay of channel paths for both receive antennas to the maximum time delay of channel paths for both antennas decreased by the length of CP. Because the total CIR length may be larger than the CP length, the C/N ratio for each receive antenna may be related to the FFT window position p as given by equation (7). Thus, by considering the MRC-based receiver, the combined C/N ratio from two receive antennas may be computed as:

$$\frac{C}{N_{MRC}}(p) = \frac{C}{N_{ant1}}(p) + \frac{C}{N_{ant2}}(p) = \quad (12)$$

$$= \frac{\sum_{l:all} |h_{l,1}|^2 - Pow_{ICI,ISI,1}(p)}{Pow_{ICI,ISI,1}(p) + \delta_{\eta,1}^2} + \frac{\sum_{l:all} |h_{l,2}|^2 - Pow_{ICI,ISI,2}(p)}{Pow_{ICI,ISI,2}(p) + \delta_{\eta,2}^2} =$$

$$= \frac{SNR_1 - Pow_{ICI,ISI,1}(p)/\delta_{\eta,1}^2}{Pow_{ICI,ISI,1}(p)/\delta_{\eta,1}^2 + 1} + \frac{SNR_2 - Pow_{ICI,ISI,2}(p)/\delta_{\eta,2}^2}{Pow_{ICI,ISI,2}(p)/\delta_{\eta,2}^2 + 1} =$$

$$= \frac{SNR_1 - \alpha(p)}{\alpha(p) + 1} + \frac{SNR_2 - \beta(p)}{\beta(p) + 1} =$$

$$= \frac{SNR_1 + 1}{\alpha(p) - 1} + \frac{SNR_2 + 1}{\beta(p) + 1} - 2,$$

where $\alpha(p) = Pow_{ICI,ISI,1}(p)/\delta_{\eta,1}^2$ and $\beta(p) = Pow_{ICI,ISI,2}(p)/\delta_{\eta,2}^2$. SNR1 and SNR2 represent signal-to-noise ratio values measured at the first and second receive antenna, respectively.

According to equation (12), the optimum FFT window position for an exemplary case of two antennas at the receiver may be determined as:

$$p_{opt} = \underset{p}{\mathrm{argmax}}\left(\frac{C}{N_{MRC}}(p)\right) = \qquad (13)$$

$$= \underset{p}{\mathrm{argmax}}\left(\frac{SNR_1 + 1}{\alpha(p) + 1} + \frac{SNR_2 + 1}{\beta(p) + 1}\right) \approx$$

$$\approx \underset{p}{\mathrm{argmin}}(SNR_1 \times Pow_{ICI,ISI}(p)_1 + SNR_2 \times Pow_{ICI,ISI}(p)_2).$$

The linear phase compensation at each receive antenna may be expressed as:

$$ph_a = CM_a + CP, \; a = 0, 1 \qquad (14)$$

where $CM_a$ is a center of a mass of the estimated channel profile with a reference point located at the optimum FFT window position $p_{opt}$ determined by equation (13).

Because of independent fading of channels for both receive antennas, the Automatic Gain Control (AGC) and the signal-to-noise ratio (SNR) may be different at each receive antenna, as illustrated in FIG. 9. In order to estimate the noise variance $\delta_n^2$ for each receive antenna, estimation of SNR (i.e., no ICI and ISI due to the FFT window position are included) for each receive antenna may be required. However, it may not be straightforward to separate noise components that correspond to ICI and ISI from other noise contributions. Thus, the noise power without ICI and ISI contributions may be approximately computed as:

$$\delta_\eta^2 = \text{Channel\_Power} \cdot 10^{-\frac{S\hat{N}R}{10}}, \qquad (15)$$

where Channel_Power is a total power of all selected channel paths, while the value of $S\hat{N}R$ may be provided by some other module at the receiver. On the other hand, estimated channel profile within the observation window may be already distorted due to the FFT window position. In other words, some parts of the channel path energy may be weakened by factor $$\frac{N - (p - d_l)}{N}$$

or factor $$\frac{N - (d_l - G - p)}{N}.$$

In order to reduce the computational complexity of the operation given by equation (13), it may not be required to evaluate every single position within a search range that spans from the minimum channel delay spread to the maximum channel delay spread for both receive antennas decreased by the length of CP. For certain embodiments of the present disclosure, every fourth or every eighth sample may be evaluated.

Exemplary Supervisory Loop for Adjustment of FFT Window Position

Positions of the FAP and the LAP may be measured and updated for every frame (i.e., every 5 msec for a wireless system under the WiMAX standard). Therefore, for an exemplary case of the receiver with two antennas, a common FFT window position for both antennas may be updated for each transmitted frame.

Figure 10:
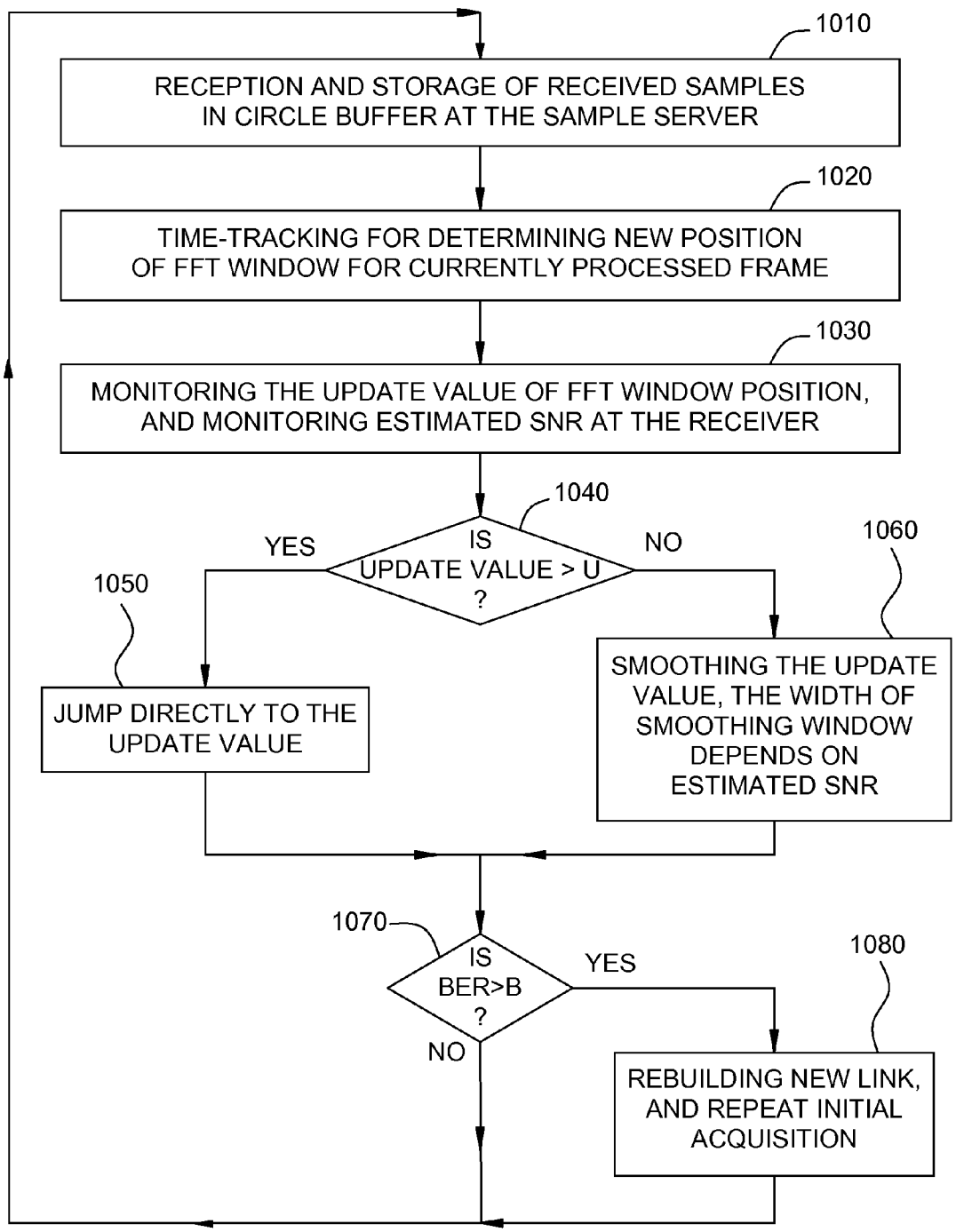
FIG. 10 shows a process of time tracking supervisory loop for updating a position of FFT window in accordance with certain embodiments of the present disclosure.

FIG. 10 illustrates example operations for a time tracking supervisory loop algorithm for adjusting an updated value for the position of FFT window from one frame to another. At 1010, a circle buffer at the sample server may be utilized for a reception and storage of received samples. At 1020, a time tracking may be applied to determine a position of FFT window for the current frame. The updated value for the position of FFT window may be monitored at 1030 by comparing positions of FFT window from one frame to another. If the updated value is smaller than the pre-determined time duration U (decision step 1040), a short term average may be applied, at 1060, to smooth the updated value of FFT window position. As an example, an Infinite Impulse Response (IIR) filter may be applied to smooth the updated value. If the updated value is larger than the pre-determined time duration for several consecutive frames, e.g., more than half of the CP length, the position of FFT window may jump directly to the updated value, at 1050, in order to avoid losing the lock.

An estimated SNR value monitored at 1030 may be also utilized at 1060 to configure a range of the smoothing window. If the time tracking loop loose the lock due to the incorrect updated value for the position of FFT window, then a bit error rate (BER) at the receiver may be very poor (larger than a tolerable value). If the BER at the received is larger than a pre-determined threshold value B (decision step 1070), then a new link may be rebuilt and an initial acquisition may be repeated, at 1080. In any case, the reception and storage of the next data frame may continue at 1010.

Exemplary Implementation of Time Tracking Loop

Figure 11:
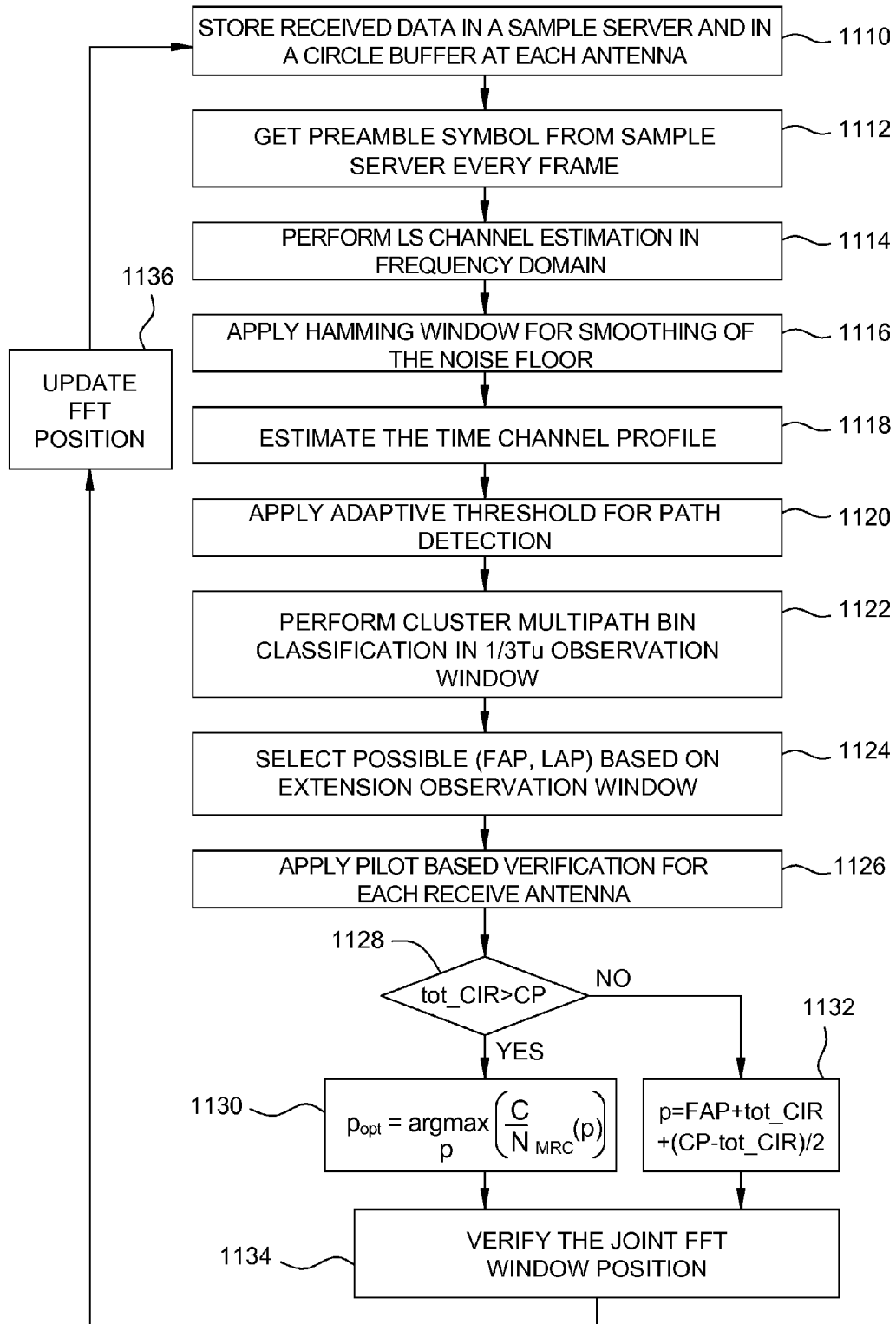
FIG. 11 shows a process of time tracking algorithm for adjusting the position of FFT window at the receiver in WiMAX systems in accordance with certain embodiments of the present disclosure.

More detailed operations, according to certain embodiments of a time tracking loop algorithm applied in a WiMAX system for updating a position of FFT window, are shown in FIG. 11. At 1110, a sample server and a circle buffer may be utilized for reception and storage of transmitted samples at each receive antenna. By considering the effect of the pilot verification latency (i.e., based on current or the next frame), it may be required to utilize a preamble of the current frame for verification of the (FAP, LAP) pair, at 1112.

For one embodiment of the present disclosure, in order to keep the same size of current buffer while reducing the sample rate, the number of symbols in the sampling server may be doubled. In other words, in order to preserve the same capability for an adjacent interference rejection, an interpolation may be performed before inputting samples into the FFT module. For another embodiment of the present disclosure, in order to add a snapshot buffer in a sample server to store two or three OFDM symbols including the preamble symbol, a time counter may be included in order to identify the time relation between the snapshot buffer and the circle buffer in the sample server.

Based on the cell identification and segment information, the channel frequency response may be estimated at 1114 based on the least-square (LS) algorithm after performing the dispreading of the pseudo-random noise (PN) sequence. At 1116, the Hamming windowing may be employed in time domain to smooth the noise variance. The noise variance $\delta_n^2$ may be initially calculated by averaging the power of noise over all 256 samples within the observation window.

At 1118, the IFFT operation of size 256 samples may be applied in order to obtain the time domain channel profile. At 1120, by setting the threshold parameter $\gamma=10$, the channel path may be detected if the power of an associated sample is larger than $\gamma \cdot \delta_n^2$. After that, the second noise variance may be obtained by removing the effect of the detected multipath energy. By setting the threshold parameter $\gamma=4$, the possible weak multipath may be also detected, at 1120.

By setting the observation silence period to $1/48 \cdot T_U$ (i.e., to 16 samples of the channel profile buffer out of 256 samples), the maximum channel delay that may be supported is equal to $15/48 \cdot T_U$. Within the time channel profile buffer of size 256 samples, detected channel paths may belong to the same multipath cluster if all position gaps between detected channel paths are smaller than the observation silence period. Detected channel paths with position gaps larger than the observation silence period may belong to different multipath clusters.

At 1122, initial multipath cluster classification within the observation window of size $1/3 \cdot T_U$ samples may be performed. Based on the initial cluster classification, an extended observation window may be obtained by circularly extending the observation window by $\pm 1/3 \cdot T_U$ samples. Multipath clusters may need to be reassigned according to position gaps between all detected channel paths, especially those channel paths that belong to two adjacent multipath clusters. If the position gap of channel paths is smaller than the pre-defined observation silence period, then the adjacent multipath clusters may be replaced with a single multipath cluster. At 1124, all possible (FAP, LAP) combination pairs may be selected for verification, while the extended observation window may be utilized. The entire channel profile that may be observed within the original $1/3 \cdot T_U$ observation window may be included within time durations of all (FAP, LAP) combination pairs.

Within a possible (FAP, LAP) time duration, positions of channel paths may be obtained by searching for the largest sample's power in each multipath cluster. Positions of channel paths may be mapped to the sample server as a head pointer for the purpose of performing pilot correlation at each possible path. By considering the mapping offset, a small correlation peak search range may be employed for each channel path. The maximum peak power may be then taken as the path energy from the corresponding multipath cluster. At 1126, a sum value of all largest levels of power within the possible (FAP, LAP) time duration may be established as a metric for verification of the FAP and the LAP positions.

By considering the verified (FAP, LAP) combination pairs at each receive antenna, a total channel delay for the receiver with two antennas (i.e., total length of CIR) may be determined. If the total CIR length is smaller than the CP length (decision step 1128), then the possible FFT window position may be determined by applying equation (4), at 1132. Otherwise, the FFT window position may be obtained by applying equation (13), at 1130. In order to reduce the computational complexity, the FFT window position may be computed for every 8 or 16 samples based on maximizing $$\frac{C}{N_{MRC}}(p),$$

as given by equation (13).

At 1134, verification of the obtained FFT window position may be performed. A short term average (i.e., IIR filter) may be applied to smooth the updated value of the FFT window position. In the case when the FFT window position updated value is large for several consecutive frames (e.g., more than a half of the CP length), the FFT window position may be adjusted directly to the requested updated value. The common FFT window position for both receiver antennas may be updated for each frame, at 1036.

Exemplary Simulation Results

The CP-based and the pilot-based verification methods for detecting the FAP and the LAP positions may be simulated in the present disclosure. It is assumed that aliasing of channel path samples is present. It may be demonstrated that the CP-based verification method may not be as reliable as the pilot-based verification in the case when the channel delay spread is long (i.e., the CIR length approaches two times of the CP length) due to large ISI components. The pilot-based method may be more reliable in this case due to a high gain of utilized transmitted PN sequence. Simulation results for the pilot-based verification method are shown in the present disclosure.

The WiMAX wireless system may be considered for exemplary simulations. The length of CP in the typical WiMAX system is about 11 μsec. The FFT size for multicarrier modulation may be equal to 1024 samples, and the FFT window position may be offset by 64 samples on the right direction. The pilot-based method may be simulated for different situations including various IFFT sizes utilized for estimating the time domain channel profile, different pilot correlation lengths, various verification latencies (i.e., verification may be based on the current frame or on the next frame), and other conditions. A simulated channel model may be based on the Vehicle B channel since this particular channel may be the most challenging environment for the accuracy of time tracking algorithm.

Figure 12:
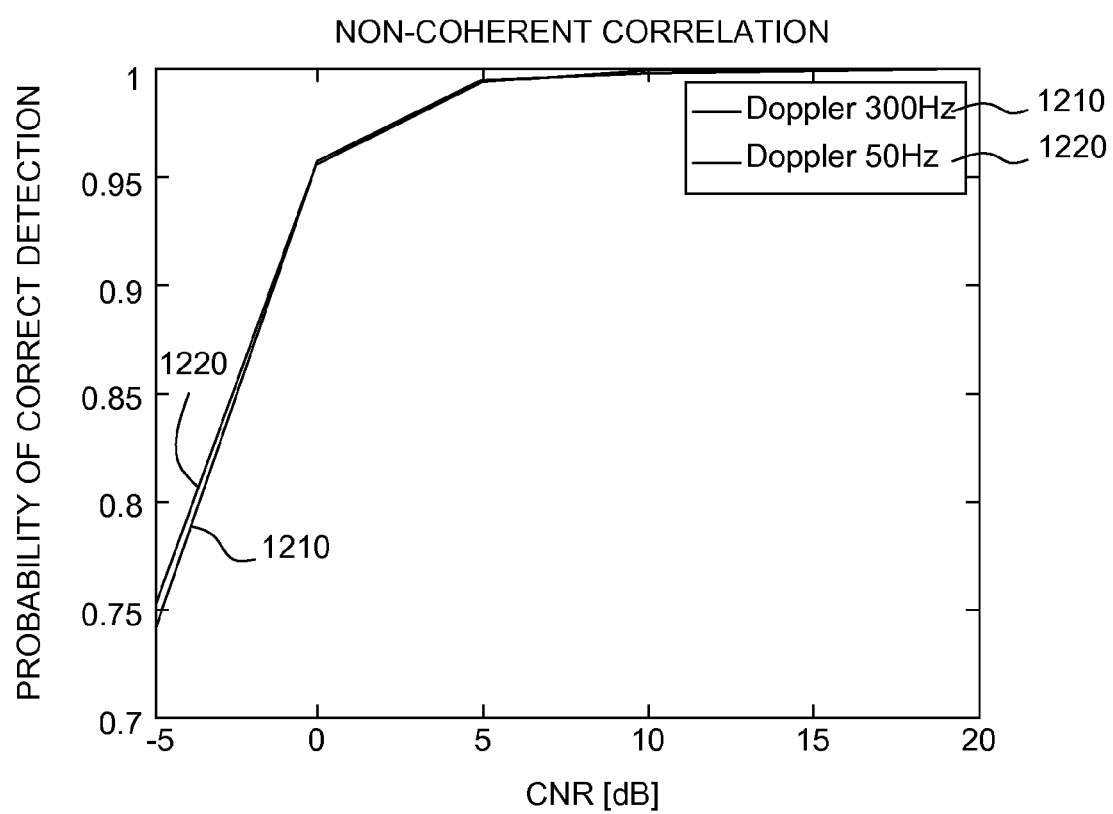
FIG. 12 shows a probability for correct detection of the first arrival path in various fading channels in accordance with certain embodiments of the present disclosure.
Figure 13:
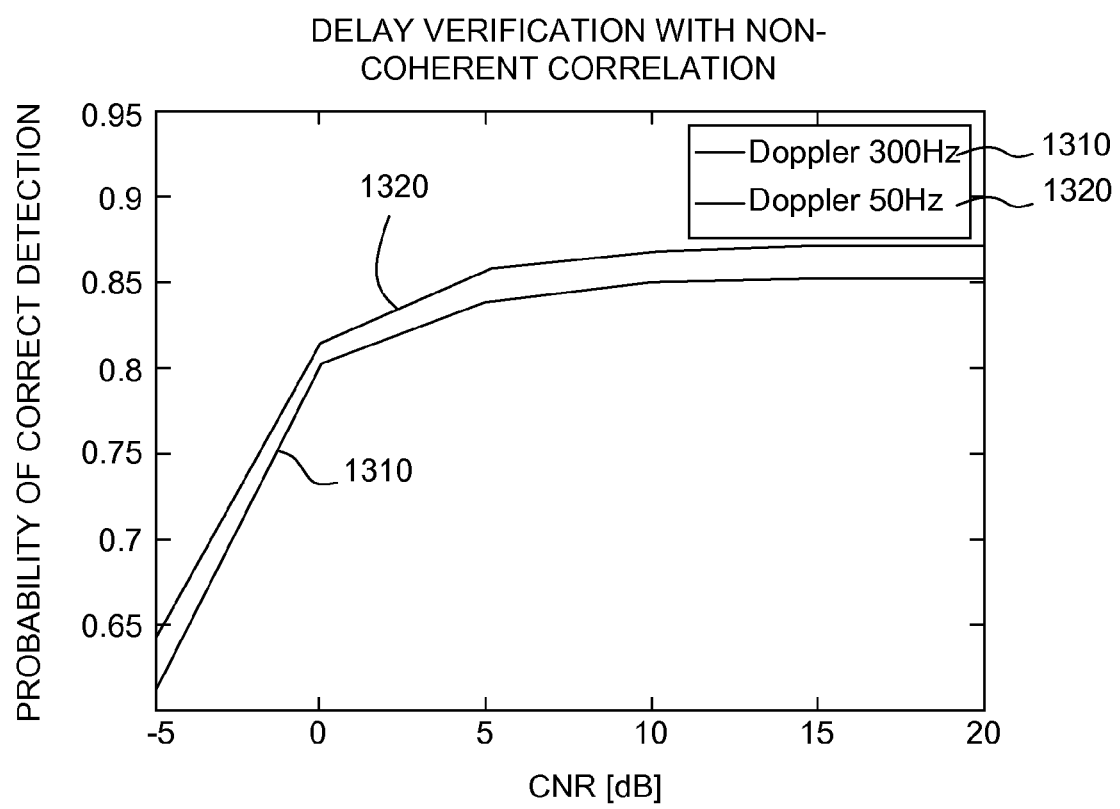
FIG. 13 shows a probability for correct detection of the first arrival path for various verification latencies in accordance with certain embodiments of the present disclosure.
Figure 14:
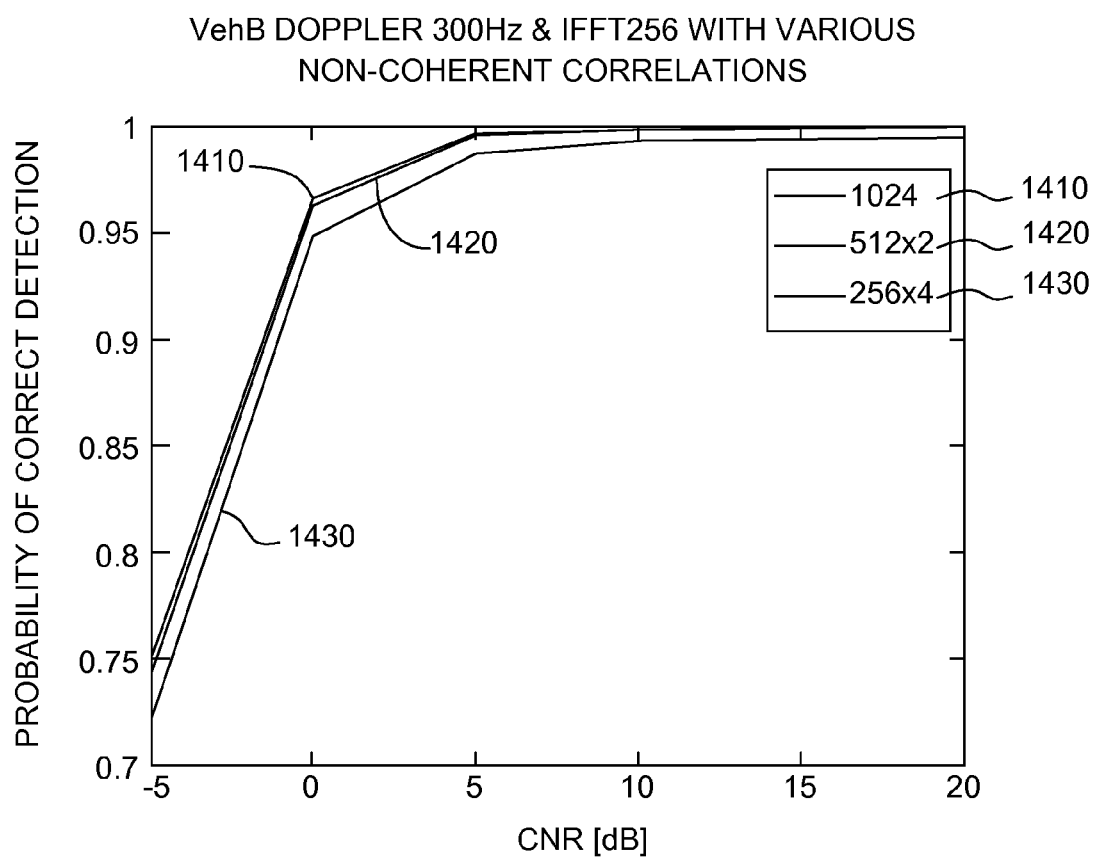
FIG. 14 shows a probability for correct detection of the first arrival path for various non-coherent correlations in particular fading channel environment in accordance with certain embodiments of the present disclosure.

For measuring a probability of the accurate FAP detection, the metric may be that the measured FAP is within 10 samples around the ideal position of the true FAP. If the true FAP is very weak due to the channel fading (i.e., less than −15 dB) and the detection of the true FAP is failed, then the measured FAP could be within 10 samples of the closest strong channel path. The size of utilized IFFT operation may be 512 samples, there are 6 channel paths with the following time delay profile: [0.0, 0.3, 8.9, 12.9, 13.1, 18.0] sec. The power profile (in the case of circular shifting) may be equal to [−2.5, 0.0, −12.8, −10.0, −25.2, −16.0] dB. FIG. 12 shows the probability for accurate detection of the first arrival path for various fading profiles. FIG. 13 shows the probability for accurate detection of the first arrival path with various verification latencies. FIG. 14 shows the probability for accurate detection of the first arrival path with various non-coherent correlations. It can be observed high accuracy of FAP detection for all simulated cases and in various channel environments with different Doppler effects.

Figure 15:
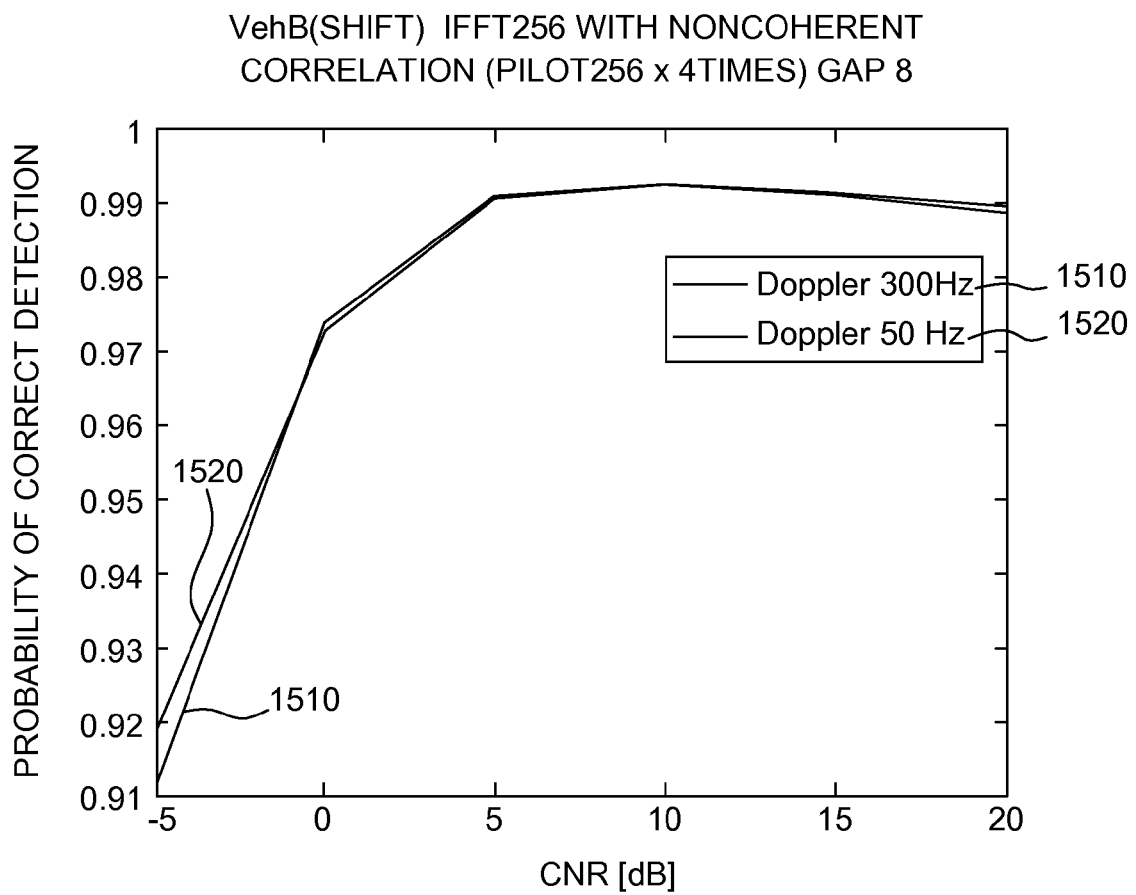
FIG. 15 shows a probability for correct detection of the FFT window position in various fading channels with a calculation sample gap of 8 samples in accordance with certain embodiments of the present disclosure.
Figure 16:
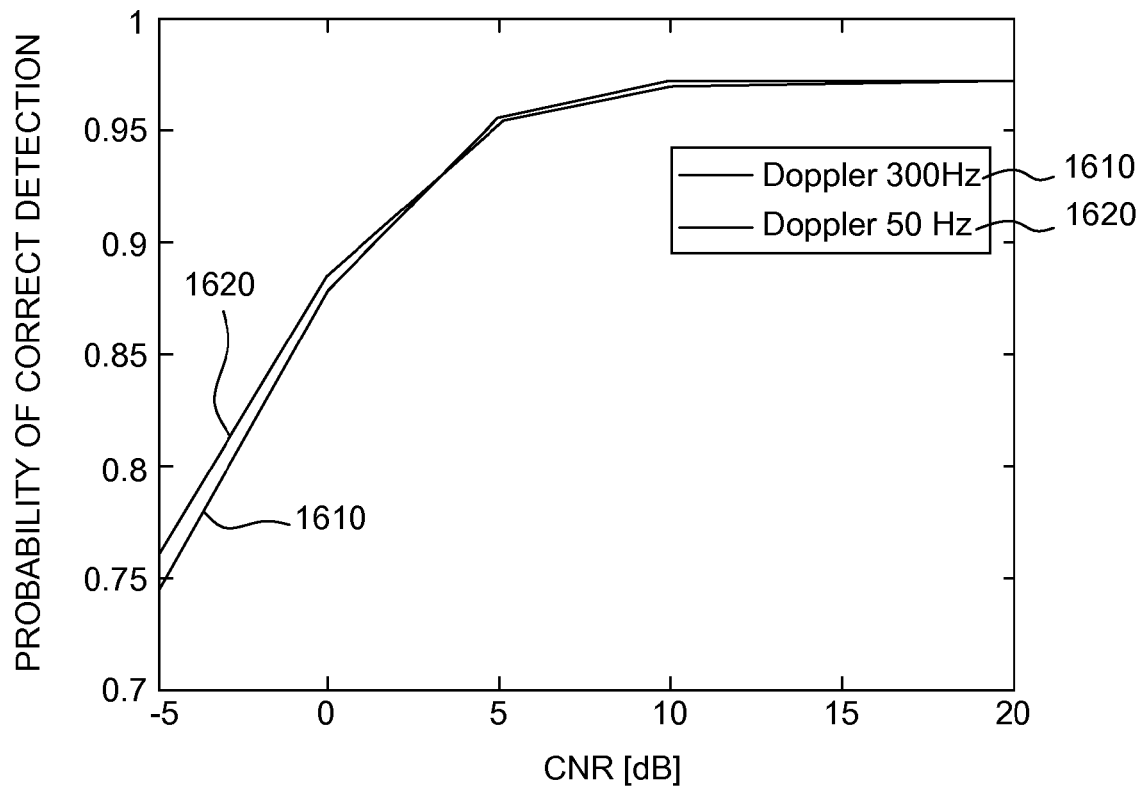
FIG. 16 shows a probability for correct detection of the FFT window position in various fading channels with a calculation sample gap of 16 samples in accordance with certain embodiments of the present disclosure.

Measuring a probability for accurate detection of FFT window position may be performed for an exemplary case of two antennas at the receiver. FIG. 15 and FIG. 16 show a probability of accurate detection of FFT window position for a gap of 8 and 16 samples, respectively. Again, it can be assumed a metric that the FFT window position may be determined within 10 samples around the ideal FFT window position. Size of utilized IFFT operation may be 256 samples, there are 6 channel paths with the following delay profile: [0.0, 0.3, 8.9, 12.9, 17.1, 20.0] sec. The power profile (in the case of circular shifting) may be equal to [−2.5, 0.0, −12.8, −10.0, −25.2, −16.0] dB. Estimated channel profiles at both receive antennas may undergo independent fading. FIG. 15 and FIG. 16 show good accuracy of the time tracking algorithm in environments with slow and fast velocities (channels with low and high Doppler frequencies).

Figure 10A:
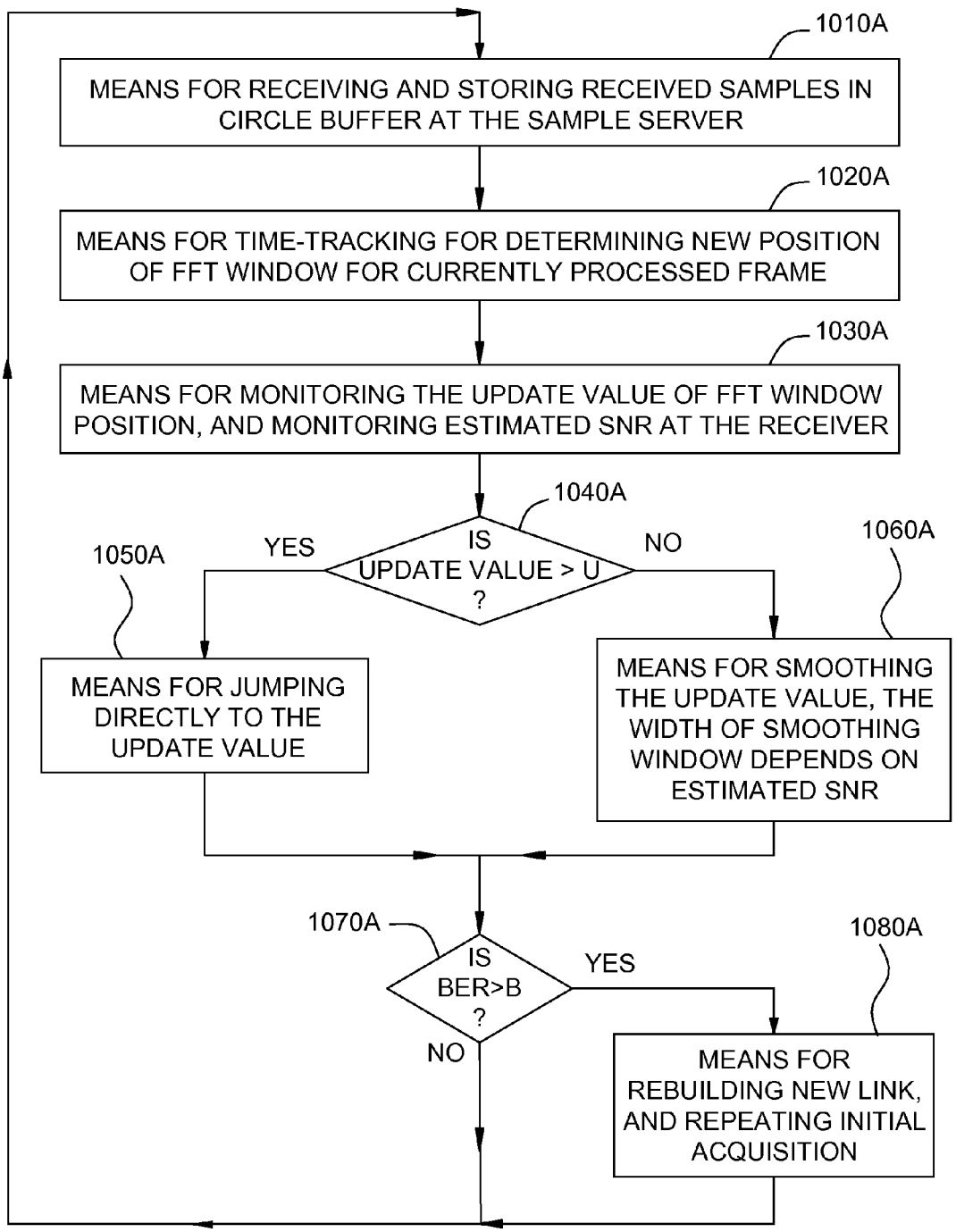
FIG. 10A illustrates example components capable of performing the operations illustrated in FIG. 10.
Figure 11A:
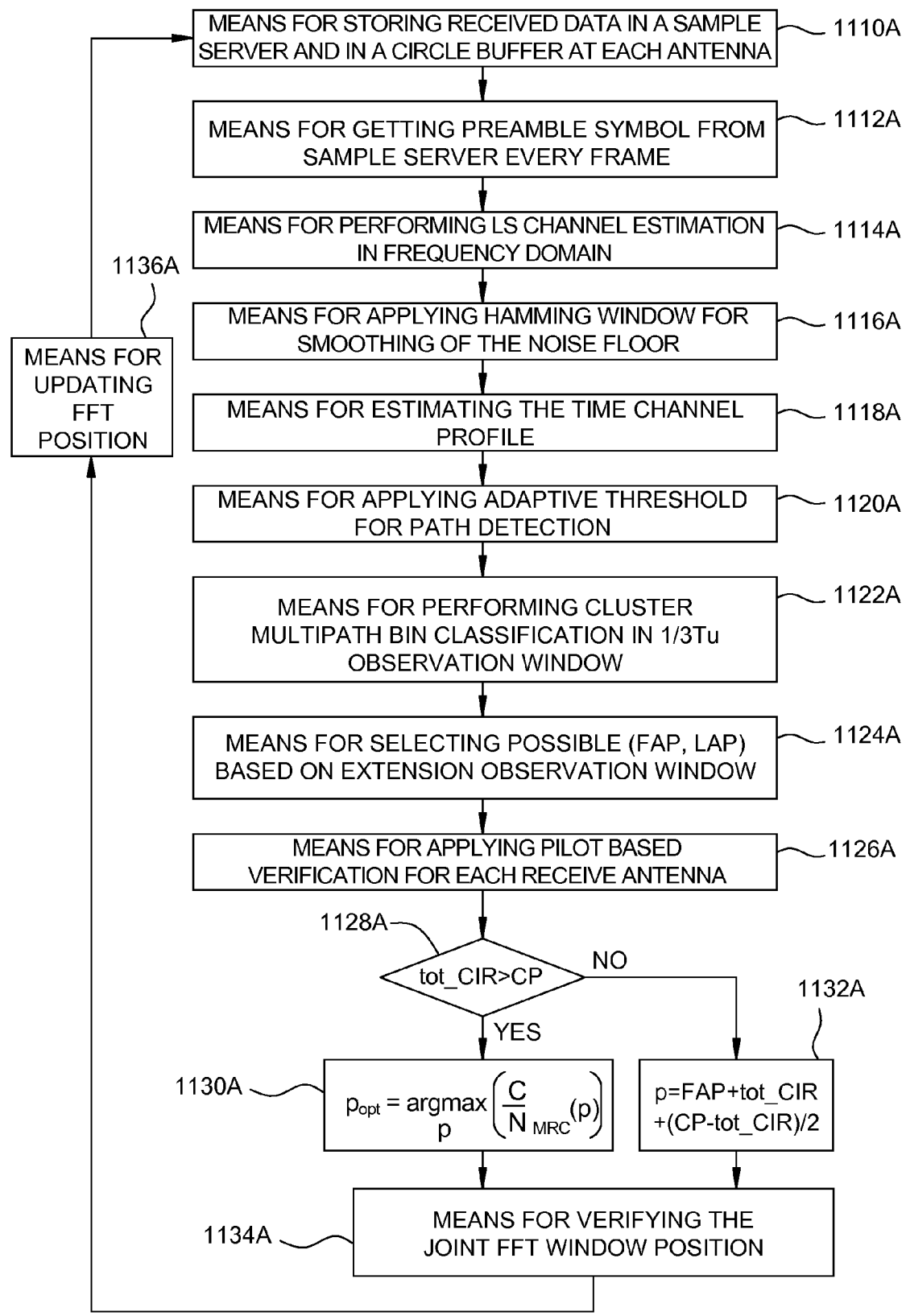
FIG. 11A illustrates example components capable of performing the operations illustrated in FIG. 1.

The various operations of methods described above may be performed by various hardware and/or software component(s) and/or module(s) corresponding to means-plus-function blocks illustrated in the Figures. For example, blocks 1010-1080 illustrated in FIG. 10 correspond to means-plusfunction blocks 1080A-1080A illustrated in FIG. 10A. Similarly, blocks 1110-1136 illustrated in FIG. 11 correspond to means-plus-function blocks 1110A-1136A illustrated in FIG. 11A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method comprising:
performing a multipath cluster classification within an original observation window, wherein pairs of detected channel paths are assigned to a same multipath cluster if a position gap between corresponding channel paths is smaller than an observation silence period;
detecting channel paths by comparing energy of samples with a noise variance multiplied by a predefined threshold parameter; and
updating a position of a Fast Fourier Transform (FFT) window at a receiver based on the detected channel paths.

2. The method of claim 1, wherein detecting channel paths comprises:
setting the threshold parameter to a first level for initial detection of channel paths;
excluding initially detected channel paths from the original observation window; and
setting the threshold parameter to a second level for detection of channel paths with an energy smaller than an energy of the initially detected channel paths in the original observation window.

3. The method of claim 1, further comprising:
extending the original observation window by circularly repeating the original observation window to obtain an extended observation window;
re-assigning multipath clusters based on values of position gaps for all detected channel paths relative to the observation silence period; and
verifying possible pairs of locations for a first arrival path and a last arrival path within the extended observation window.

4. The method of claim 3, further comprising:
correlating samples of a cyclic prefix with samples that correspond to possible locations of the first arrival path and the last arrival path to obtain correlation values; and
detecting positions of the first arrival path and the last arrival path with a largest of the correlation values.

5. The method of claim 3, further comprising:
correlating samples of a preamble with samples that correspond to possible locations of the first arrival path and the last arrival path to obtain correlation values; and detecting positions of the first arrival path and the last arrival path with a largest of the correlation values.

6. The method of claim 3, further comprising:
peak-searching in every multipath cluster around a position of a channel path with the largest energy in every multipath cluster; and
verifying energy levels of channel paths in multipath clusters starting from channel paths with a largest of the energy levels and continuing with a smaller energy level until the most likely channel profile is obtained.

7. The method of claim 1, further comprising:
determining a length of a channel impulse response (CIR) as a difference between a time location of a first arrival path and a time location of a last arrival path, wherein the length of the CIR is smaller than a length of a cyclic prefix (CP); and
determining an updated value of a position of the FFT window based on the length of the CR, the length of the CP and a position of the first arrival path.

8. The method of claim 7, further comprising:
smoothing the updated value of the position of the FFT window by applying a short term average if the updated value of the position of the FFT window is smaller than a pre-defined threshold value.

9. The method of claim 7, further comprising:
updating a position of the FFT window directly to the updated value if the determined value of the position of the FFT window is larger than a pre-defined threshold value a plurality of consecutive frames.

10. The method of claim 7, further comprising:
computing a linear phase compensation at the receiver by using a center of mass of an estimated channel profile with a reference point located at the updated value of the position of the FFT window and the length of the CP.

11. The method of claim 1, further comprising:
determining a carrier-to-noise (C/N) ratio value at the receiver as a function of the position of the FFT window; and
determining the position of the FFT window in an effort to maximize the C/N ratio value at the receiver;
wherein the receiver is equipped with one antenna and a length of a channel impulse response is larger than a length of a cyclic prefix.

12. The method of claim 1, further comprising:
determining a carrier-to-noise (C/N) ratio value at every receive antenna as a function of a position of the FFT window;
computing a common C/N ratio for both receive antennas based on determined C/N ratio values at every receive antenna by using a maximum ratio combining (MRC) algorithm; and
determining a position of the FFT window in an effort to maximize the common C/N ratio for both receive antennas;
wherein the receiver is equipped with two antennas and a length of a channel impulse response is larger than a length of a cyclic prefix.

13. An apparatus comprising:
logic for performing a multipath cluster classification within an original observation window, wherein pairs of detected channel paths are assigned to a same multipath cluster if a position gap between corresponding channel paths is smaller than an observation silence period;
logic for detecting channel paths by comparing energy of samples with a noise variance multiplied by a predefined threshold parameter; and
logic for updating a position of a Fast Fourier Transform (FFT) window at the apparatus based on the detected channel paths.

14. The apparatus of claim 13, wherein the logic for detecting channel Paths comprises:
logic for setting the threshold parameter to a first level for initial detection of channel paths;
logic for excluding initially detected channel paths from the original observation window; and
logic for setting the threshold parameter to a second level for detection of channel paths with an energy smaller than an energy of the initially detected channel paths in the original observation window.

15. The apparatus of claim 13, further comprising:
logic for extending the original observation window by circularly repeating the original observation window to obtain an extended observation window;
logic for re-assigning multipath clusters based on values of position gaps for all detected channel paths relative to the observation silence period; and
logic for verifying possible pairs of locations for a first arrival path and a last arrival path within the extended observation window.

16. The apparatus of claim 15, further comprising:
logic for correlating samples of a cyclic prefix with samples that correspond to possible locations of the first arrival path and the last arrival path to obtain correlation values; and
logic for detecting positions of the first arrival path and the last arrival path with a largest of the correlation values.

17. The apparatus of claim 15, further comprising:
logic for correlating samples of a preamble with samples that correspond to possible locations of the first arrival path and the last arrival path to obtain correlation values; and
logic for detecting positions of the first arrival path and the last arrival path with a largest of the correlation values.

18. The apparatus of claim 15, further comprising:
logic for peak-searching in every multipath cluster around a position of a channel path with the largest energy in every multipath cluster; and
logic for verifying energy levels of channel paths in multipath clusters starting from channel paths with a largest of the energy levels and continuing with a smaller energy level until the most likely channel profile is obtained.

19. The apparatus of claim 13, further comprising:
logic for determining a length of a channel impulse response (CIR) as a difference between a time location of a first arrival path and a time location of a last arrival path, wherein the length of the CIR is smaller than a length of a cyclic prefix (CP); and
logic for determining an updated value of a position of the FFT window based on the length of the CIR, the length of the CP and a position of the first arrival path.

20. The apparatus of claim 19, further comprising:
logic for smoothing the updated value of the position of the FFT window by applying a short term average if the updated value of the position of the FFT window is smaller than a pre-defined threshold value.

21. The apparatus of claim 19, further comprising:
logic for updating a position of the FFT window directly to the updated value if the determined value of the position of the FFT window is larger than a pre-defined threshold value for a plurality of consecutive frames.

22. The apparatus of claim 19, further comprising:
logic for computing a linear phase compensation at the apparatus by using a center of mass of an estimated channel profile with a reference point located at the updated value of the position of the FFT window and the length of the CP.

23. The apparatus of claim 13, further comprising:
logic for determining a carrier-to-noise (C/N) ratio value at the apparatus as a function of the position of the FFT window; and
logic for determining the position of the FFT window in an effort to maximize the C/N ratio value at the apparatus;
wherein the apparatus is equipped with one antenna and a length of a channel impulse response is larger than a length of a cyclic prefix.

24. The apparatus of claim 13, further comprising:
logic for determining a carrier-to-noise (C/N) ratio value at every receive antenna as a function of a position of the FFT window;
logic for computing a common C/N ratio for both receive antennas based on determined C/N ratio values at every receive antenna by using a maximum ratio combining (MRC) algorithm; and
logic for determining a position of the FFT window in an effort to maximize the common C/N ratio for both receive antennas;
wherein the apparatus is equipped with two antennas and a length of a channel impulse response is larger than a length of a cyclic prefix.

25. An apparatus comprising:
means for performing a multipath cluster classification within an original observation window, wherein pairs of detected channel paths are assigned to a same multipath cluster if a position gap between corresponding channel paths is smaller than an observation silence period;
means for detecting channel paths by comparing energy of samples with a noise variance multiplied by a predefined threshold parameter; and
means for updating a position of a Fast Fourier Transform (FFT) window at the apparatus based on the detected channel paths.

26. The apparatus of claim 25, wherein the means for detecting channel paths comprises:
means for setting the threshold parameter to a first level for initial detection of channel paths;
means for excluding initially detected channel paths from the original observation window; and
means for setting the threshold parameter to a second level for detection of channel paths with an energy smaller than an energy of the initially detected channel paths in the original observation window.

27. The apparatus of claim 25, further comprising:
means for extending the original observation window by circularly repeating the original observation window to obtain an extended observation window;
means for re-assigning multipath clusters based on values of position gaps for all detected channel paths relative to the observation silence period; and
means for verifying possible pairs of locations for a first arrival path and a last arrival path within the extended observation window.

28. The apparatus of claim 27, further comprising:
means for correlating samples of a cyclic prefix with samples that correspond to possible locations of the first and the last arrival path to obtain correlation values; and
means for detecting positions of the first arrival path and the last arrival path with a largest of the correlation values.

29. The apparatus of claim 27, further comprising:
means for correlating samples of a preamble with samples that correspond to possible locations of the first arrival path and the last arrival path to obtain correlation values; and
means for detecting positions of the first arrival path and the last arrival path with a largest of the correlation values.

30. The apparatus of claim 27, further comprising:
means for peak-searching in every multipath cluster around a position of a channel path with the largest energy in every multipath cluster; and
means for verifying energy levels of channel paths in multipath clusters starting from channel paths with a largest of the energy levels and continuing with a smaller energy level until the most likely channel profile is obtained.

31. The apparatus of claim 25, further comprising:
means for determining a length of a channel impulse response (CIR) as a difference between a time location of a first arrival path and a time location of a last arrival path, wherein the length of the CIR is smaller than a length of a cyclic prefix (CP); and
means for determining an updated value of a position of the FFT window based on the length of the CIR, the length of the CP and a position of the first arrival path.

32. The apparatus of claim 31, further comprising:
means for smoothing the updated value of the position of the FFT window by applying a short term average if the updated value of the position of the FFT window is smaller than a pre-defined threshold value.

33. The apparatus of claim 31, further comprising:
means for updating a position of the FFT window directly to the updated value if the determined value of the position of the FFT window is larger than a pre-defined threshold value for a plurality of consecutive frames.

34. The apparatus of claim 31, further comprising:
means for computing a linear phase compensation at the apparatus by using a center of mass of an estimated channel profile with a reference point located at the updated value of the position of the FFT window and the length of the CP.

35. The apparatus of claim 25, further comprising:
means for determining a carrier-to-noise (C/N) ratio value at the apparatus as a function of the position of the FFT window; and
means for determining the position of the FFT window in an effort to maximize the C/N ratio value at the apparatus;
wherein the apparatus is equipped with one antenna and a length of a channel impulse response is larger than a length of a cyclic prefix.

36. The apparatus of claim 25, further comprising:
means for determining a carrier-to-noise (C/N) ratio value at every receive antenna as a function of a position of the FFT window;
means for computing a common C/N ratio for both receive antennas based on determined C/N ratio values at every receive antenna by using a maximum ratio combining (MRC) algorithm; and
means for determining a position of the FFT window in an effort to maximize the common C/N ratio for both receive antennas;
wherein the apparatus is equipped with two antennas and a length of a channel impulse response is larger than a length of a cyclic prefix.

37. A computer-program product comprising a non-transitory computer readable medium having instructions stored thereon, the instructions being executable by one or more processors and the instructions comprising:

instructions for performing a multipath cluster classification within an original observation window, wherein pairs of detected channel paths are assigned to a same multipath cluster if a position gap between corresponding channel paths is smaller than an observation silence period;

instructions for detecting channel paths by comparing energy of samples with a noise variance multiplied by a predefined threshold parameter; and instructions for updating a position of a Fast Fourier Transform (FFT) window at a receiver based on the detected channel paths.

38. The computer-program product of claim 37, wherein the instructions for detecting channel paths comprise:

instructions for setting the threshold parameter to a first level for initial detection of channel paths;

instructions for excluding initially detected channel paths from the original observation window; and instructions for setting the threshold parameter to a second level for detection of channel paths with an energy smaller than an energy of the initially detected channel paths in the original observation window.

39. The computer-program product of claim 37, wherein the instructions further comprise:

instructions for extending the original observation window by circularly repeating the original observation window to obtain an extended observation window;

instructions for re-assigning multipath clusters based on values of position gaps for all detected channel paths relative to the observation silence period; and instructions for verifying possible pairs of locations for a first arrival path and a last arrival path within the extended observation window.

40. The computer-program product of claim 39, wherein the instructions further comprise:

instructions for correlating samples of cyclic prefix with samples that correspond to possible locations of the first arrival path and the last arrival path to obtain correlation values; and instructions for detecting positions of the first arrival path and the last arrival path with a largest of the correlation values.

41. The computer-program product of claim 39, wherein the instructions further comprise:

instructions for correlating samples of a preamble with samples that correspond to possible locations of the first arrival path and the last arrival path to obtain correlation values; and instructions for detecting positions of the first arrival path and the last arrival path with a largest of the correlation values.

42. The computer-program product of claim 39, wherein the instructions further comprise:

instructions for peak-searching in every multipath cluster around a position of a channel path with the largest energy in every multipath cluster; and instructions for verifying energy levels of channel paths in multipath clusters starting from channel paths with a largest of the energy levels and continuing with a smaller energy level until the most likely channel profile is obtained.

43. The computer-program product of claim 37, wherein the instructions further comprise:

instructions for determining a length of a channel impulse response (CIR) as a difference between a time location of a first arrival path and a time location of a last arrival path, wherein the length of the CIR is smaller than a length of a cyclic prefix (CP); and instructions for determining an updated value of a position of the FFT window based on the length of the CIR, the length of the CP and a position of the first arrival path.

44. The computer-program product of claim 43, wherein the instructions further comprise:

instructions for smoothing the updated value of the position of the FFT window by applying a short term average if the updated value of the position of the FFT window is smaller than a pre-defined threshold value.

45. The computer-program product of claim 43, wherein the instructions further comprise:

instructions for updating a position of the FFT window directly to the updated value if the determined value of the position of the FFT window is larger than a pre-defined threshold value for a plurality of consecutive frames.

46. The computer-program product of claim 43, wherein the instructions further comprise:

instructions for computing a linear phase compensation at the receiver by using a center of mass of an estimated channel profile with a reference point located at the updated value of the position of the FFT window and the length of the CP.

47. The computer-program product of claim 37, wherein the instructions further comprise:

instructions for determining a carrier-to-noise (C/N) ratio value at the receiver as a function of the position of the FFT window; and instructions for determining the position of the FFT window in an effort to maximize the C/N ratio value at the receiver;

wherein the receiver is equipped with one antenna and a length of a channel impulse response is larger than a length of a cyclic prefix.

48. The computer-program product of claim 37, wherein the instructions further comprise:

instructions for determining a carrier-to-noise (C/N) ratio value at every receive antenna as a function of a position of the FFT window;

instructions for computing a common C/N ratio for both receive antennas based on determined C/N ratio values at every receive antenna by using a maximum ratio combining (MRC) algorithm; and instructions for determining a position of the FFT window in an effort to maximize the common C/N ratio for both receive antennas;

wherein the receiver is equipped with two antennas and a length of a channel impulse response is larger than a length of a cyclic prefix.

* * * * *